(12) United States Patent
Shimamura et al.

(10) Patent No.: US 11,308,318 B2
(45) Date of Patent: Apr. 19, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Koya Shimamura, Tokyo (JP); Junya Arakawa, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 160 days.

(21) Appl. No.: 16/415,499

(22) Filed: May 17, 2019

(65) Prior Publication Data

US 2019/0370539 A1    Dec. 5, 2019

(30) Foreign Application Priority Data

May 30, 2018  (JP) .............................. JP2018-103878
Jan. 31, 2019  (JP) .............................. JP2019-016307

(51) Int. Cl.
*G06K 9/00* (2006.01)
*G06T 3/00* (2006.01)
*H04N 1/387* (2006.01)

(52) U.S. Cl.
CPC ..... *G06K 9/00463* (2013.01); *G06K 9/00456* (2013.01); *G06T 3/0056* (2013.01); *H04N 1/3875* (2013.01)

(58) Field of Classification Search
None
See application file for complete search history.

(56) References Cited

U.S. PATENT DOCUMENTS

| | | | |
|---|---|---|---|
| 11,069,068 B2* | 7/2021 | Shimamura | G06T 7/174 |
| 2006/0221411 A1 | 10/2006 | Aoki | |
| 2009/0175537 A1* | 7/2009 | Tribelhorn | G06K 9/3233 382/173 |
| 2011/0002015 A1* | 1/2011 | Hayakawa | H04N 1/00816 358/448 |

(Continued)

FOREIGN PATENT DOCUMENTS

| | | |
|---|---|---|
| CN | 101610340 A | 12/2009 |
| CN | 103905700 A | 7/2014 |

(Continued)

OTHER PUBLICATIONS

JP 2013157965 A English machine transaktion; Oda et al. Aug. 15, 2013 (Year: 2013).*

(Continued)

*Primary Examiner* — Nancy Bitar
(74) *Attorney, Agent, or Firm* — Canon U.S.A., Inc. IP Division

(57) ABSTRACT

An image processing apparatus generates a first image by adjusting luminance so as to preserve a signal value on a high-luminance side among signal values acquired by reading a document by a scanner, and detects a position of a region corresponding to the document in the generated first image. The image processing apparatus further generates a second image by performing adjustment so as to increase luminance of a pixel contained in the first image, and crops a document image from the generated second image based on the detected position of the region corresponding to the document.

16 Claims, 27 Drawing Sheets

(56) References Cited

U.S. PATENT DOCUMENTS

2017/0155792 A1\* 6/2017 Mizude .............. H04N 1/00748
2018/0103169 A1   4/2018 Mizude

FOREIGN PATENT DOCUMENTS

| JP | 2003-338920 A | 11/2003 |
| JP | 2005-354421 A | 12/2005 |
| JP | 2013157965 A  | 8/2013  |
| JP | 2017-103593 A | 6/2017  |

OTHER PUBLICATIONS

JP 2011-223064 Image reader Apr. 11, 2011 ; Sonada et al English machine translation (Year: 2011).\*

\* cited by examiner

FIG.5A

| | INVOICE | | | | |
|---|---|---|---|---|---|
| DOCUMENT A | | | | | |

INVOICE NUMBER: A123

TO: ABCDE COMPANY
MS. HANAKO YAMADA
Tel: 0123-456-789
Fax: 0123-456-789

AIUEO COMPANY
TANAKA
Tel: 0123-456-789
Fax: 0123-456-789

| No. | PRODUCT NUMBER | PRODUCT | UNIT PRICE | QUANTITY | TOTAL |
|---|---|---|---|---|---|
| 1 | 1234 | A PART | ¥10,000 | 3 | ¥30,000- |
| 2 | 9876 | PRODUCT B | ¥1,000 | 5 | ¥5,000- |
| 3 | | | | | |
| 4 | | | | | |
| | | | | TOTAL DUE | ¥35,000- |

RECEIPT MAY 10, 2016

TO: ABCDE COMPANY
FOR A PART
¥30,000-

DOCUMENT B
AIUEO COMPANY
TANAKA

RECEIPT MAY 7, 2016

TO: ABCDE COMPANY

¥5,000- FOR PRODUCT B

DOCUMENT C
AIUEO COMPANY
TANAKA

FIG.5B

DOCUMENT A  INVOICE
INVOICE NUMBER: A123

TO: ABCDE COMPANY
MS. HANAKO YAMADA
Tel: 0123-456-789
Fax: 0123-456-789

AIUEO COMPANY
TANAKA
Tel: 0123-456-789
Fax: 0123-456-789

| No. | PRODUCT NUMBER | PRODUCT | UNIT PRICE | QUANTITY | TOTAL |
|---|---|---|---|---|---|
| 1 | 1234 | A PART | ¥10,000 | 3 | ¥30,000- |
| 2 | 9876 | PRODUCT B | ¥1,000 | 5 | ¥5,000- |
| 3 | | | | | |
| 4 | | | | | |
| | | | | TOTAL DUE | ¥35,000- |

RECEIPT MAY 10, 2016

TO: ABCDE COMPANY
FOR A PART
¥30,000-

DOCUMENT B
AIUEO COMPANY
TANAKA

RECEIPT MAY 7, 2016

TO: ABCDE COMPANY

¥5,000- FOR PRODUCT B

DOCUMENT C
AIUEO COMPANY
TANAKA

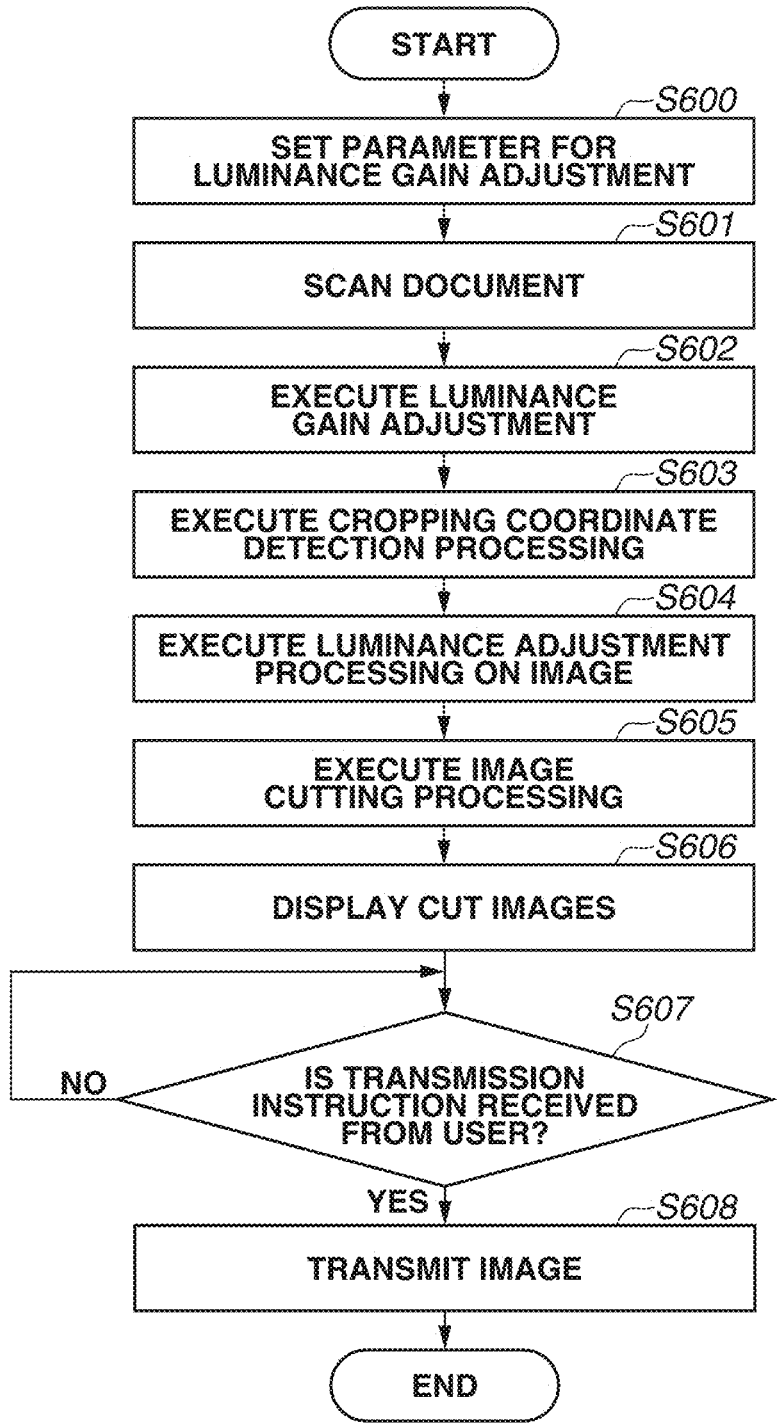

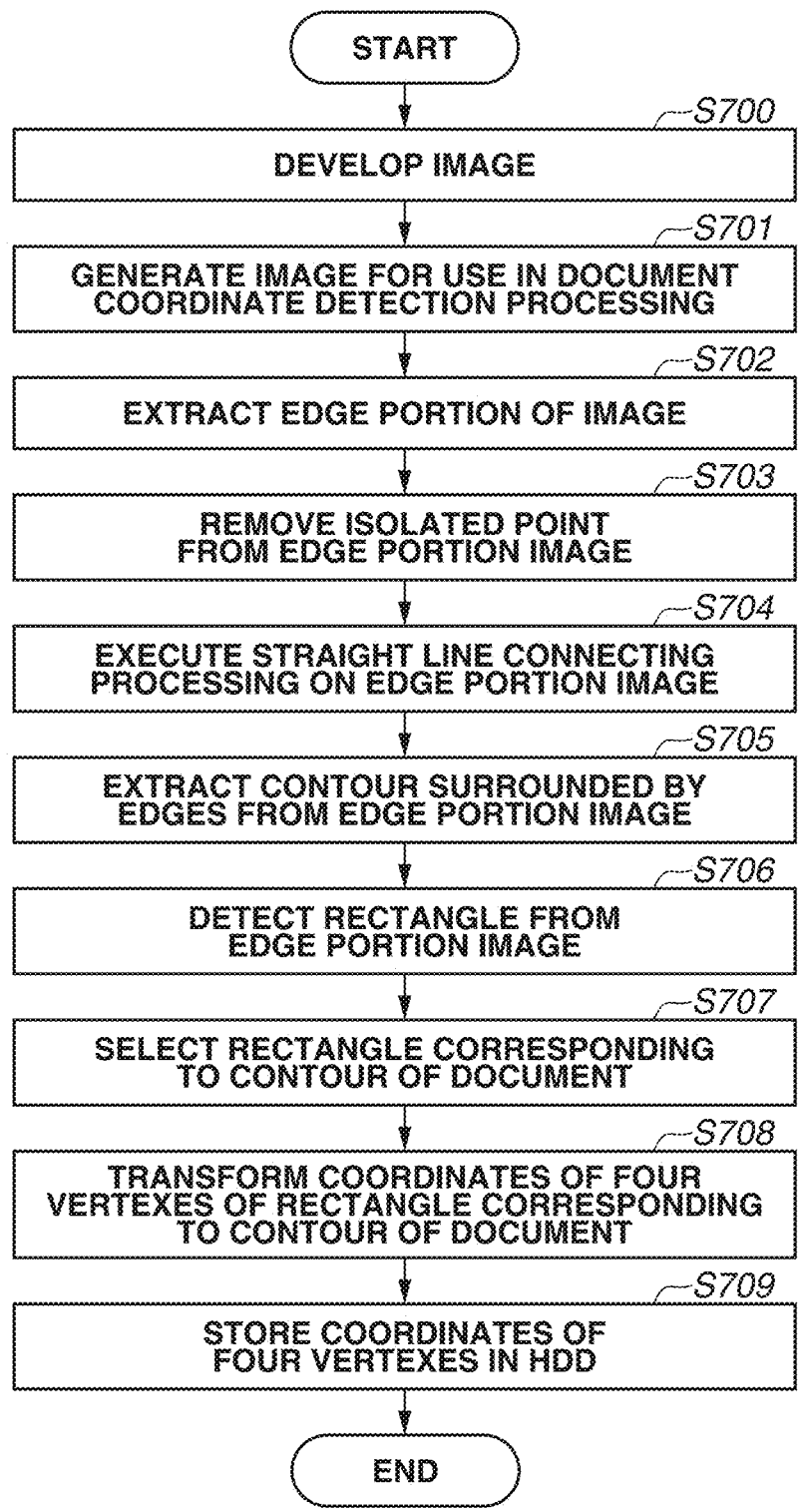

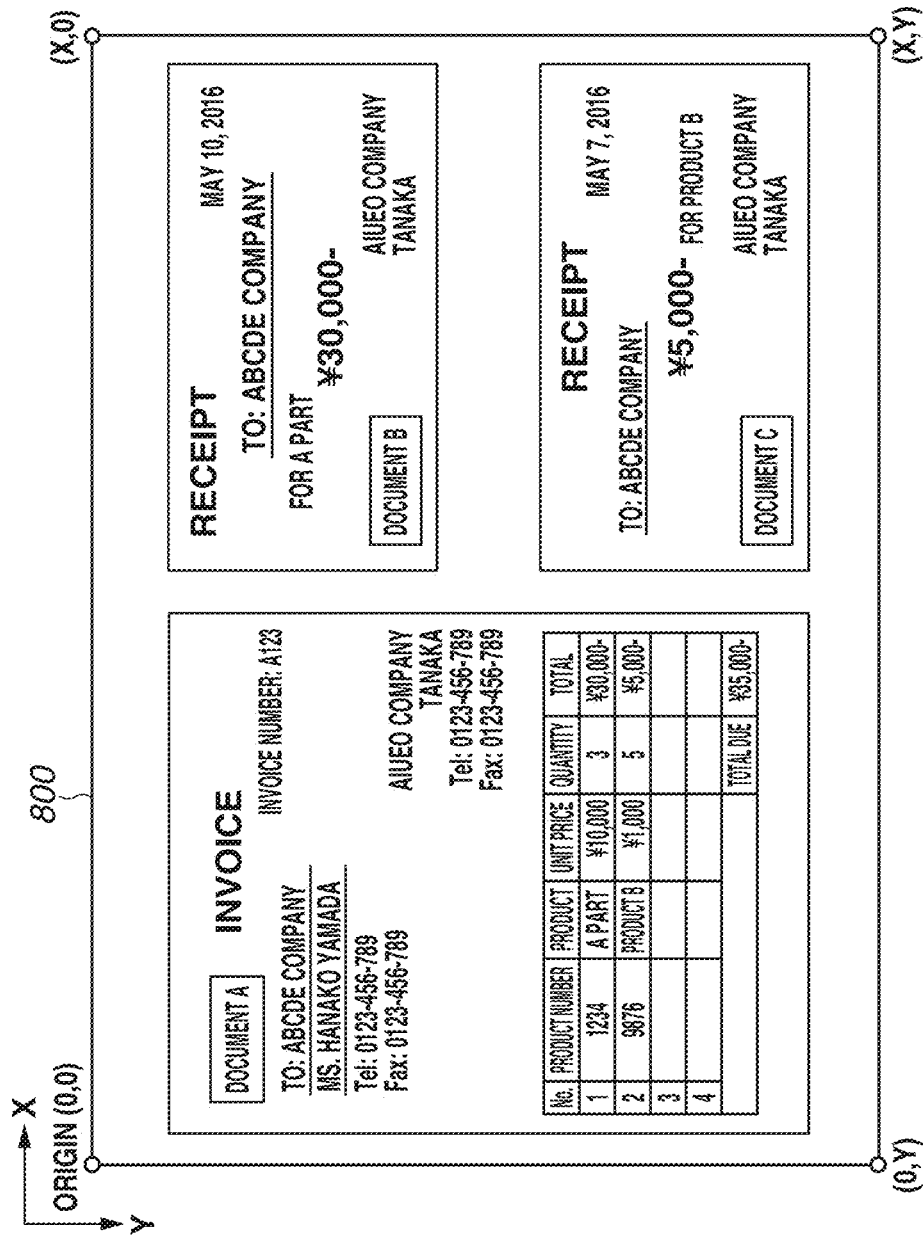

FIG.13

| Index | INPUT R | INPUT G | INPUT B | OUTPUT R | OUTPUT G | OUTPUT B |
|---|---|---|---|---|---|---|
| 0 | 0 | 0 | 0 | 0 | 0 | 0 |
| 1 | 0 | 0 | 17 | 0 | 0 | 19 |
| 2 | 0 | 0 | 34 | 0 | 0 | 39 |
| ⋯ | | | | | | |
| 15 | 0 | 0 | 255 | 0 | 0 | 255 |
| 16 | 0 | 17 | 0 | 0 | 19 | 0 |
| 17 | 0 | 17 | 17 | 0 | 20 | 15 |
| ⋯ | | | | | | |
| 4094 | 255 | 255 | 238 | 255 | 255 | 250 |
| 4095 | 255 | 255 | 255 | 255 | 255 | 255 |

3D LUT

Input: R(8bit), G(8bit), B(8bit)
Output: R'(8bit), G'(8bit), B'(8bit)

FIG.15A

| | INVOICE | |
|---|---|---|
| DOCUMENT A | | INVOICE NUMBER: A123 |

TO: ABCDE COMPANY
MS. HANAKO YAMADA
Tel: 0123-456-789
Fax: 0123-456-789

AIUEO COMPANY
TANAKA
Tel: 0123-456-789
Fax: 0123-456-789

| No. | PRODUCT NUMBER | PRODUCT | UNIT PRICE | QUANTITY | TOTAL |
|---|---|---|---|---|---|
| 1 | 1234 | A PART | ¥10,000 | 3 | ¥30,000- |
| 2 | 9876 | PRODUCT B | ¥1,000 | 5 | ¥5,000- |
| 3 | | | | | |
| 4 | | | | | |
| | | | | TOTAL DUE | ¥35,000- |

FIG.15B

RECEIPT                    MAY 10, 2016

TO: ABCDE COMPANY

FOR A PART
¥30,000-

DOCUMENT B              AIUEO COMPANY
                        TANAKA

FIG.15C

RECEIPT                    MAY 7, 2016

TO: ABCDE COMPANY

¥5,000-    FOR PRODUCT B

DOCUMENT C              AIUEO COMPANY
                        TANAKA

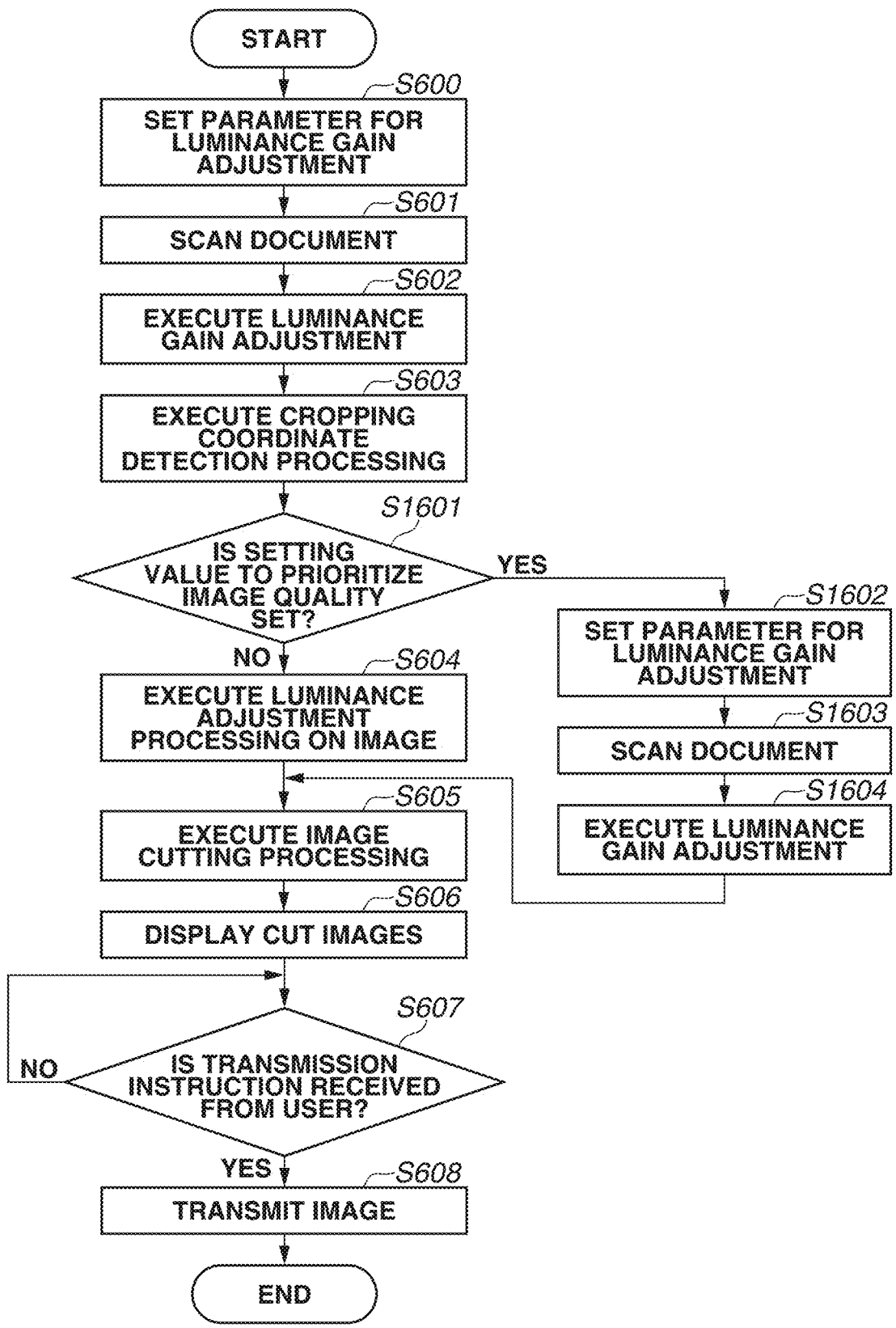

FIG.17

| SETTING ITEM | PRIORITIZE IMAGE QUALITY | PRIORITIZE SPEED |
|---|---|---|
| DOCUMENT TYPE | PICTURE PICTURE/TEXT | TEXT |
| COLOR | FULL-COLOR | MONOCHROME AUTO |
| FORMAT | JPEG | TIFF PDF |
| OCR PROCESSING | OFF | ON |
| BINARIZATION PROCESSING | OFF | ON |

FIG.23

| | INPUT VALUE (RGB 2208 AFTER COLOR SPACE CONVERSION) | | | OUTPUT VALUE (RGB VALUE OF NORMAL OUTPUT RGB 2203) | | | OUTPUT AFTER CONVERSION USING FORMULA 1 (OUTPUT VALUE × 255/265) | | | OUTPUT VALUE AFTER CORRECTION PROCESSING | | | RGB 2210 AFTER LUMINANCE ADJUSTMENT | | |
|---|---|---|---|---|---|---|---|---|---|---|---|---|---|---|---|
| | R | G | B | R | G | B | R | G | B | R | G | B | R | G | B |
| Index1 | 77 | 50 | 120 | 80 | 53 | 124 | 77.0 | 51.0 | 119.3 | 77.0 | 51.0 | 119.3 | 80 | 53 | 124 |
| Index2 | 223 | 243 | 250 | 228 | 255 | 255 | 219.4 | 245.4 | 245.4 | 219.4 | 245.4 | 250 | 228 | 255 | 255 |

IMAGE PROCESSING APPARATUS, IMAGE PROCESSING METHOD, AND STORAGE MEDIUM

BACKGROUND OF THE INVENTION

Field of the Invention

The aspect of the embodiments relates to an apparatus for cropping a region corresponding to a document from an image acquired by reading the document placed on a glass platen, an image processing method, and a storage medium.

Description of the Related Art

Multi-cropping processing is conventionally-known processing in which a plurality of documents, such as a form document, a non-standard-size receipt, a business card, and a card, is arranged on a glass platen of a flatbed scanner and scanned together and an image of each document is cropped from the generated scan image.

In the multi-cropping processing, the documents to be read, such as a form, a receipt, a business card, and a card, are often white sheets on which texts and/or images are printed. Further, the color of a glass platen cover (pressing plate) for pressing the documents is normally white, and a portion (background) without a document in a scan image is white the same as that of the glass platen cover. This sometimes leads to a failure in detection of an edge of the document during execution of multi-cropping processing on the scan image because the difference in luminance between the white document and the white background is small. Thus, methods that facilitate detection of an edge of a white document from a scan image acquired by performing scanning over a glass platen have been discussed. For example, Japanese Patent Application Laid-Open No. 2003-338920 discusses a method in which after a document is placed on a glass platen of a scanner, the document is covered with a black sheet, and scanning is executed so that a region other than the document appears black to facilitate detection of an edge of the document. Further, Japanese Patent Application Laid-Open No. 2017-103593 discusses a method in which scanning is executed with a glass platen cover opened so that a portion without a document is output in black to facilitate detection of an edge of the white document.

However, in the method discussed in Japanese Patent Application Laid-Open No. 2003-338920 the user is to place the documents on the glass platen and then place the black sheet on the documents, which is burdensome for the user. Further, in the method discussed in Japanese Patent Application Laid-Open No. 2017-103593, since the glass platen cover is kept open, illumination light hits the eyes of the user during execution of scanning, which causes a feeling of discomfort to a user. Further, when the glass platen cover is opened, the documents cannot be pressed from above, so that in a case of a curled document (e.g., receipt), the document may be partially raised from the glass platen, and this can cause a decrease in image quality of the scan image.

SUMMARY OF THE INVENTION

According to an aspect of the embodiments, an apparatus includes a first adjustment unit configured to generate a first image by adjusting luminance so as to preserve a signal value on a high-luminance side among signal values acquired by reading a document by a scanner, a detection unit configured to detect a position of a region corresponding to the document in the generated first image, a second adjustment unit configured to generate a second image by performing adjustment so as to increase luminance of a pixel contained in the first image, and a cropping unit configured to crop, based on the position of the region corresponding to the detected document, a document image corresponding to the document from the generated second image.

Further features of the disclosure will become apparent from the following description of exemplary embodiments with reference to the attached drawings.

BRIEF DESCRIPTION OF THE DRAWINGS

FIGS. 5A to 5D illustrate sample images according to the first exemplary embodiment of the disclosure.

FIG. 7 is a flowchart illustrating a normalization process using gain adjustment according to the first exemplary embodiment of the disclosure.

FIG. 9 is a flowchart illustrating a multi-cropping coordinate detection process according to the first exemplary embodiment of the disclosure.

FIGS. 10A and 10B illustrate sample images in the multi-cropping coordinate detection process according to the first exemplary embodiment of the disclosure.

FIG. 13 illustrates the luminance adjustment process according to the first exemplary embodiment of the disclosure.

FIGS. 15A, 15B, and 15C illustrate sample images in the image cropping process according to the first exemplary embodiment of the disclosure.

FIG. 16 is a flowchart illustrating an entire image processing function according to a second exemplary embodiment of the disclosure.

FIG. 17 illustrates an example of a table indicating setting values of the image processing function according to the second exemplary embodiment of the disclosure.

FIG. 23 illustrates a specific example of the luminance adjustment process.

DESCRIPTION OF THE EMBODIMENTS

Various exemplary embodiments of the disclosure will be described in detail below. It should be noted that the components described in the exemplary embodiments are mere examples and are not intended to limit the scope of the disclosure.

<System Configuration>

Figure 1:
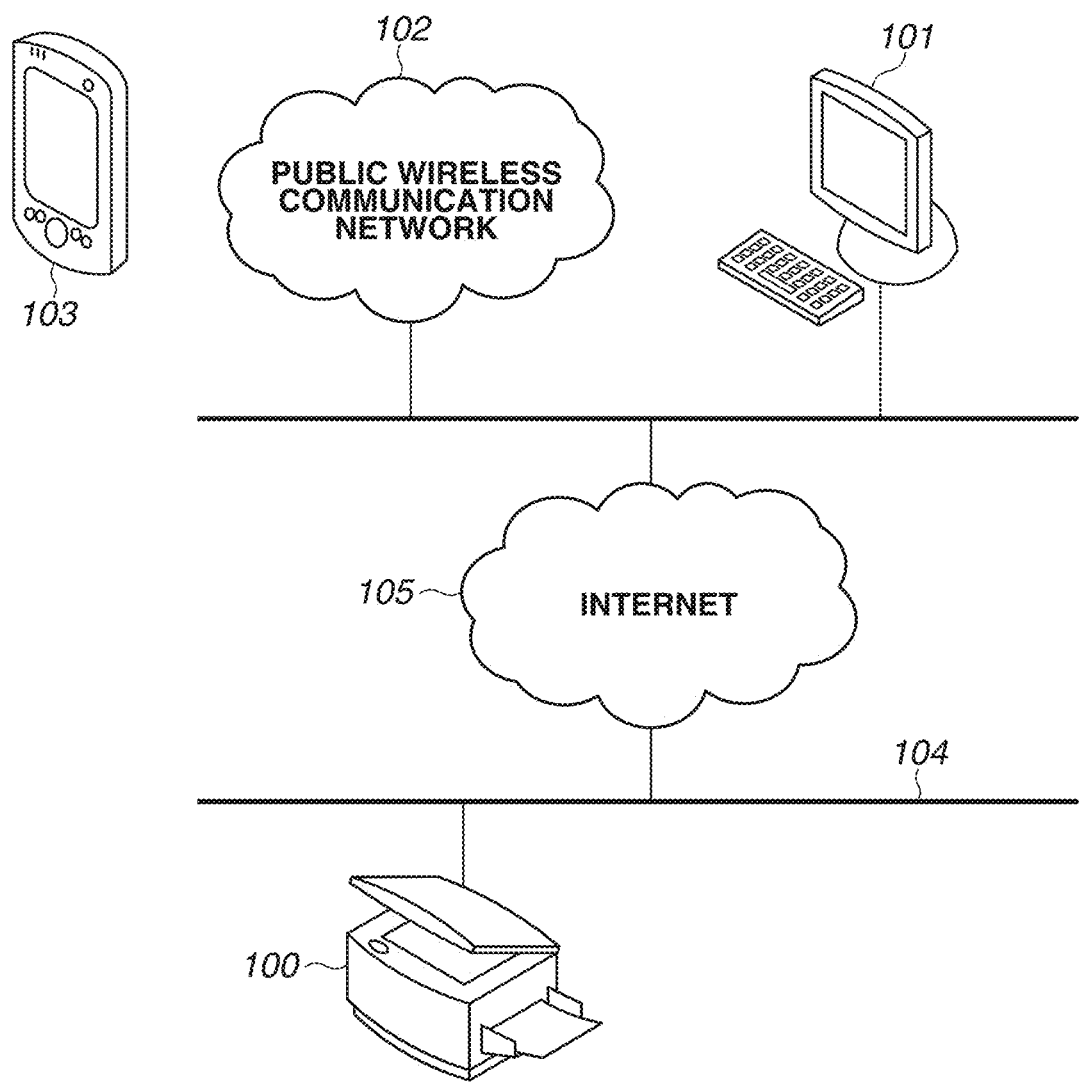
FIG. 1 illustrates an entire configuration of an applicable system according to a first exemplary embodiment of the disclosure.

A first exemplary embodiment will be described below. FIG. 1 illustrates an entire configuration of a system to which the present exemplary embodiment is applicable.

As illustrated in FIG. 1, an image processing apparatus 100 and a personal computer (PC)/server terminal 101 are connected to a local area network (LAN) 104 including Ethernet (registered trademark) or wireless LAN and is connected to the Internet 105. Further, a mobile terminal 103 is connected to the Internet 105 via a public wireless communication network 102. The image processing apparatus 100, the PC/server terminal 101, and the mobile terminal 103 are connected the Internet 105 via the LAN 104 or the public wireless communication network 102 and can communicate with one another. One of the PC/server terminal 101 and the mobile terminal 103 can be omitted, or only the image processing apparatus 100 can perform processing that is performed by the PC/server terminal 101 or the mobile terminal 103.

The image processing apparatus 100 is a multi-function peripheral including an operation unit, a scanner unit, and a printer unit. In the system according to the present exemplary embodiment, the image processing apparatus 100 is used as a scan terminal configured to read a single or plurality of documents, such as business cards, driver's license, or postcard. Further, the image processing apparatus 100 performs multi-cropping processing to extract a document image for each document from a scan image acquired by reading the document(s). Further, the image processing apparatus 100 includes a display unit and an operation unit, such as a touch panel and hardware buttons. The image processing apparatus 100 displays an error notification or instruction notification and performs an operation, such as a scan operation or setting operation, by the display unit.

The PC/server terminal 101 displays an image generated by the image processing apparatus 100. Further, the PC/server terminal 101 stores an image generated by the image processing apparatus 100 and performs optical character recognition (OCR) processing to generate reusable metadata. Alternatively, the PC/server terminal 101 can perform the multi-cropping processing performed by the image processing apparatus 100. Further, the PC/server terminal 101 is also capable of communicating with an external storage, such as a cloud or a server, and can transmit the stored image or metadata to the external storage. While the flow of a process in which the PC/server terminal 101 stores an image, generates metadata, and transmits the image or metadata to the external storage will be described in the present exemplary embodiment, the image processing apparatus 100 can include the same function. This enables the process to be performed by the image processing apparatus 100 alone.

Further, the mobile terminal 103 is a smartphone or tablet terminal including an operation unit, a wireless communication unit, and an application unit configured to cause a web browser to operate. In the system according to the present exemplary embodiment, the mobile terminal 103 is used as a display terminal, an operation terminal, and a metadata generation/storage terminal, similarly to the PC/server terminal 101. Only either of the PC/server terminal 101 and the mobile terminal 103 can include the display function, operation function and the metadata generation/storage function.

The above-described components are mere examples, and not every one of the components is essential. For example, the image processing apparatus 100 can include an image storage function, a metadata generation function, a metadata storage function, and a function of transmission to the external storage, in addition to the scan function of reading a document and the display/operation function. In the case in which the image processing apparatus 100 has the above-described configuration, the image processing apparatus 100 can execute the process described below.

<Hardware Configuration of Image Processing Apparatus 100>

Figure 2:
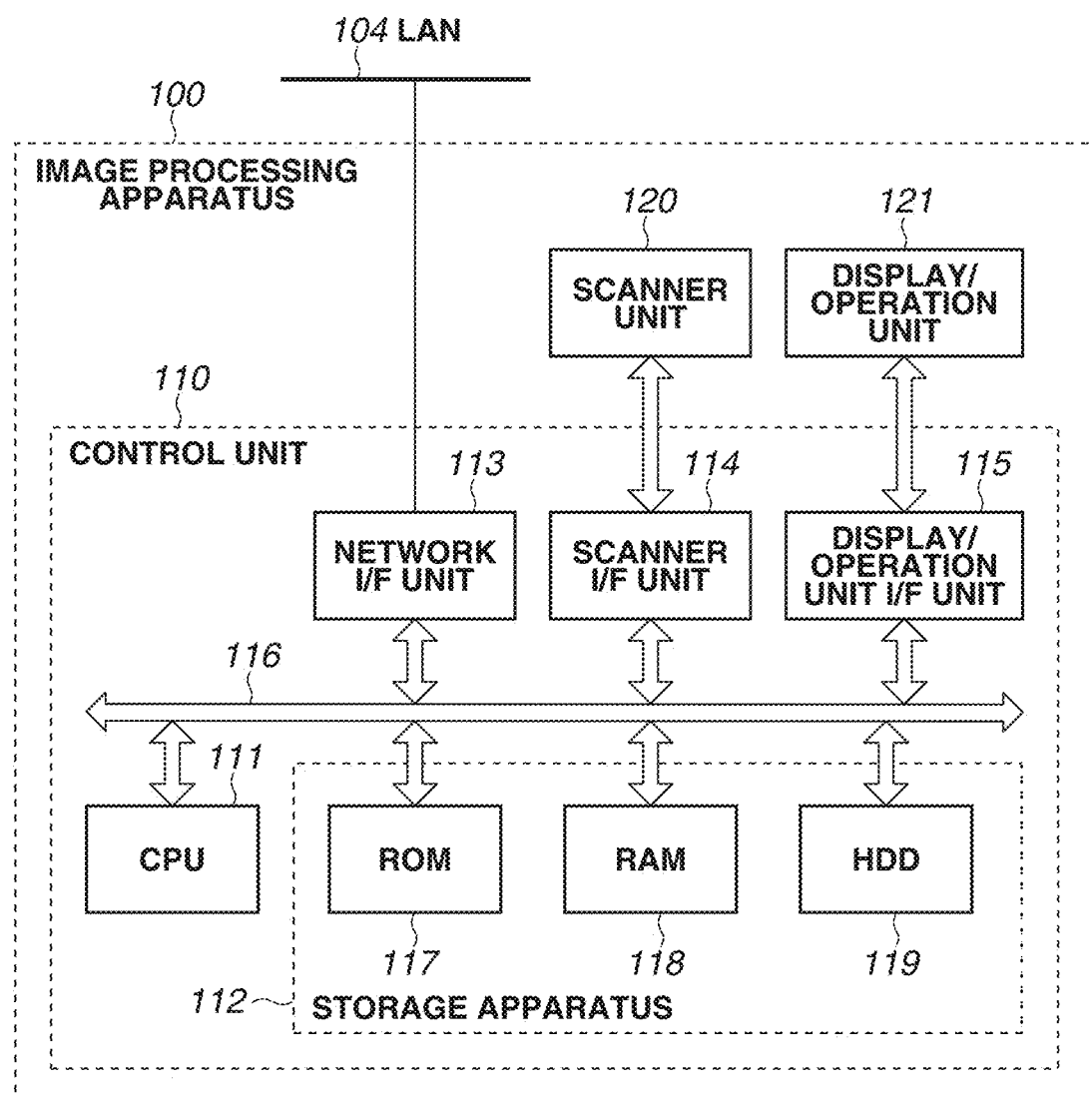
FIG. 2 illustrates an example of a hardware configuration of an image reading apparatus according to the first exemplary embodiment of the disclosure.

FIG. 2 is a block diagram illustrating a configuration of the image processing apparatus 100. A control unit 110 includes a central processing unit (CPU) 111, a storage apparatus 112, a network interface (I/F) unit 113, a scanner I/F unit 114, and a display/operation unit I/F unit 115, all of which are connected via a system bus 116 so as to be communicable with one another. The control unit 110 controls the entire operation of the image processing apparatus 100.

The CPU 111 reads a control program stored in the storage apparatus 112 and performs various control such as reading control and transmission control.

The storage apparatus 112 stores and holds the program, images, metadata, setting data, and processing result data. The storage apparatus 112 includes a read-only memory (ROM) 117, which is a non-volatile memory, a random-access memory (RAM) 118, which is a volatile memory, and a hard disk drive (HDD) 119, which is a large-capacity storage region.

The ROM 117 holds the control program. The CPU 111 reads the control program stored in the ROM 117 and controls the image processing apparatus 100.

The RAM 118 is used as a temporary storage region such as a main memory and a work area of the CPU 111.

The HDD 119 is a large-capacity storage region and is used as a storage region for storing images and metadata.

The network I/F unit 113 is an interface for connecting the control unit 110 (image processing apparatus 100) to the LAN 104. The network I/F unit 113 transmits an image to an external apparatus on the LAN 104, such as the PC/server terminal 101 or the mobile terminal 103, and receives various information from the external apparatus on the LAN 104.

The scanner I/F unit 114 is an interface for connecting a scanner unit 120 and the control unit 110. The scanner unit 120 reads an image on a document, generates an image, and inputs the generated image to the control unit 110 via the scanner I/F unit 114.

The display/operation unit I/F unit 115 is an interface for connecting a display/operation unit 121 and the control unit 110. The display/operation unit 121 includes a liquid crystal display portion with a touch panel function and hardware keys, such as numeric keys, start button, and cancel button. The start button is a button for starting copy or scan processing. The cancel button is a button for suspending or stopping processing that is being executed by the image processing apparatus 100.

While the image processing apparatus 100 also includes other units such as a printer unit, the units are not used in the present exemplary embodiment, so that description thereof is omitted.

Having the above-described hardware configuration, the image processing apparatus 100 according to the present exemplary embodiment is capable of providing the image processing function.

<Process of Executing "Scan-and-Transmit" Function>

Figure 3:
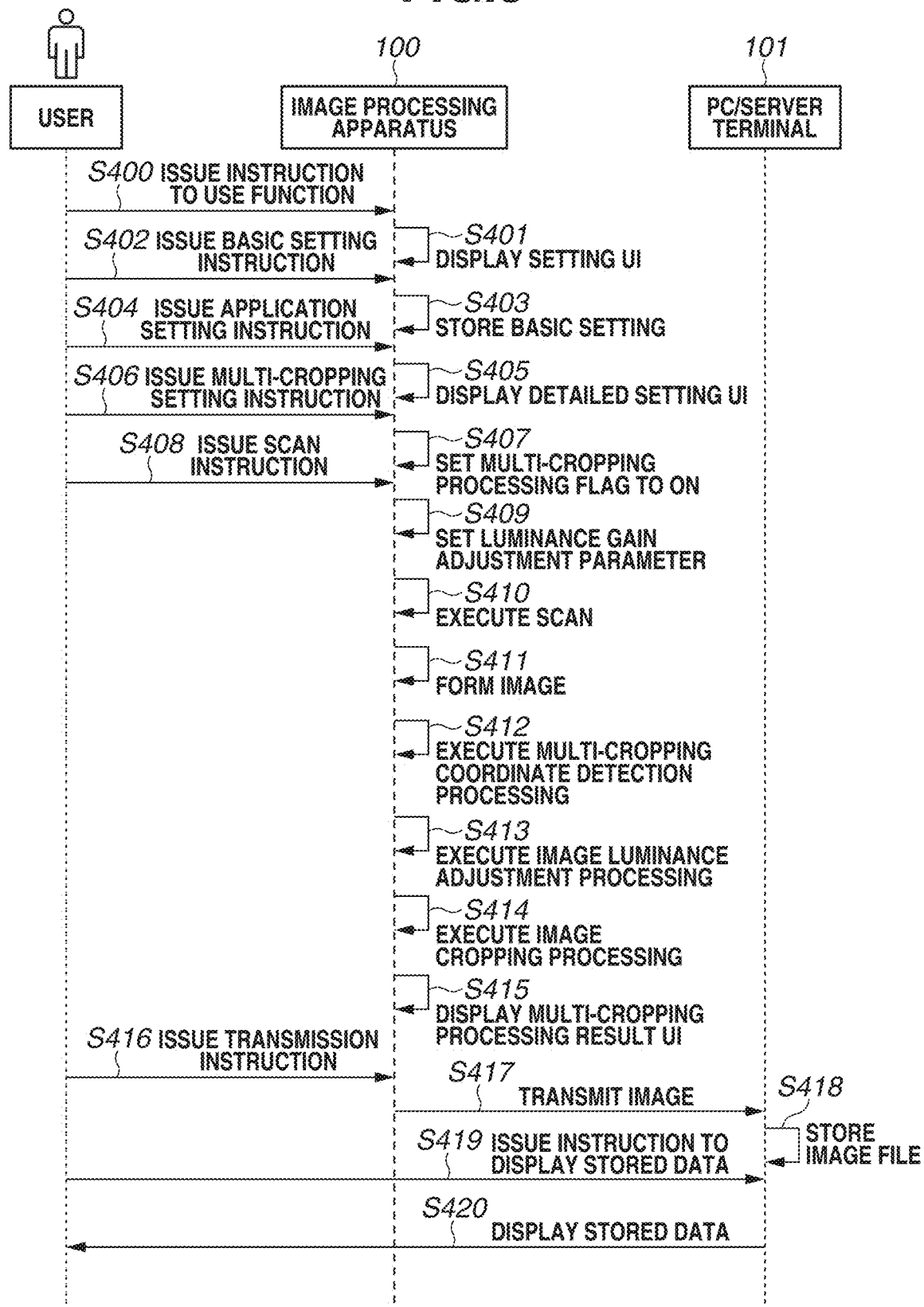
FIG. 3 illustrates a sequence of an entire image processing function according to the first exemplary embodiment of the disclosure.

A sequence in which a user executes multi-cropping processing using a "scan-and-transmit" function will be described below with reference to FIG. 3. The CPU 111 of the image processing apparatus 100 reads the control program stored in the storage apparatus 112 and executes the control program to thereby realize the process described in the present exemplary embodiment.

The "scan-and-transmit" function is a function in which an image processing apparatus connected to a network, such as a LAN, scans a document and transmits an acquired image to an external apparatus. Specifically, the "scan-and-transmit" function is a function in which a scanner reads a document to generate an image, and image processing and format conversion are executed on the image, and then the resulting image is transmitted to a user-designated folder on a server, attached to an electronic mail, or transmitted to a HDD in a copying machine.

Figure 4A:
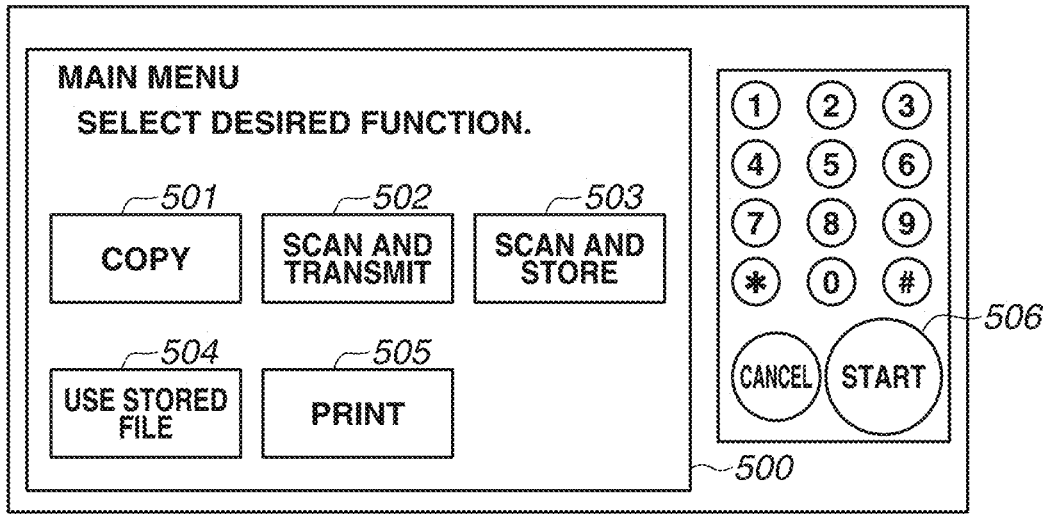
FIGS. 4A to 4E illustrate a user interface (UI) display according to the first exemplary embodiment of the disclosure.

In step S400 of issuing an instruction to use a function, the user operates the display/operation unit 121 and selects the "scan-and-transmit" function from the main menu. The image processing apparatus 100 receives the selection of the "scan-and-transmit" function via the display/operation unit 121. FIG. 4A illustrates a main menu user interface (UI) 500 displayed on the display/operation unit 121. The main menu UI 500 is a screen on which each function executable by the image processing apparatus 100 is displayed as a button. For example, a "copy" function button 501, a "scan-and-transmit" function button 502, a "scan-and-store" function button 503, a "use stored file" function button 504, and a "print" function button 505 are displayed. The image processing apparatus 100 receives selection of a function from the user via the main menu UI 500. In the present exemplary embodiment, the user taps the "scan-and-transmit" function button 502 to select the "scan-and-transmit" function.

Figure 4B:
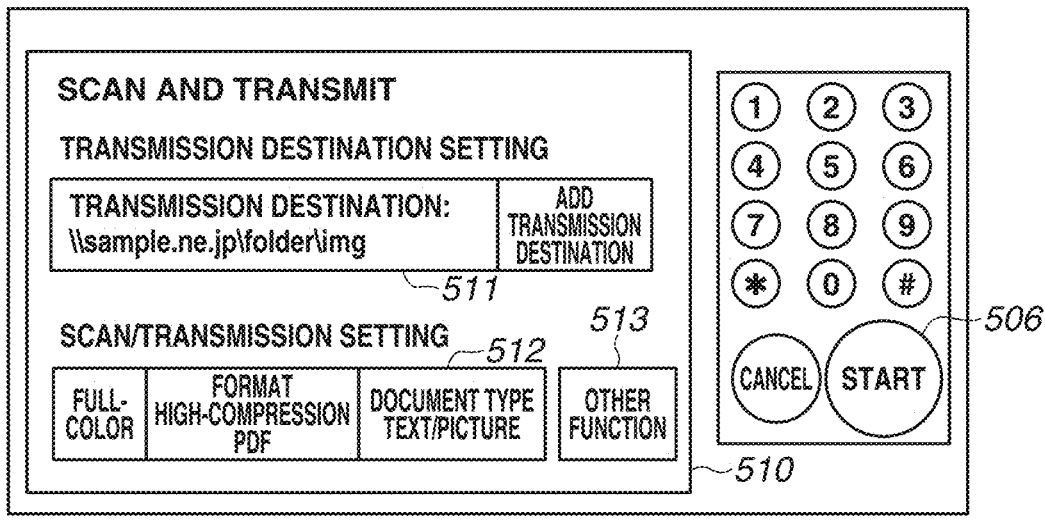

In step S401, the display/operation unit 121 of the image processing apparatus 100 displays a setting screen for the user-designated function (i.e., a setting screen for the "scan-and-transmit" function in the case in which the "scan-and-transmit" function is selected). FIG. 4B illustrates an example of a "scan-and-transmit" setting UI 510 which is a setting screen displayed on the display/operation unit 121. The "scan-and-transmit" setting UI 510 illustrates states of various settings used in the "scan-and-transmit" function. For example, a "transmission destination" 511 displays the address of a transmission destination of a generated image. If the user taps the "transmission destination" 511, a transmission destination setting screen (not illustrated) is displayed so that the user can input a transmission destination of an image. In the present exemplary embodiment, the image having undergone the multi-cropping processing is transmitted to the PC/server terminal 101. Specifically, the uniform resource locator (URL), the Internet Protocol (IP) address, and the electronic mail address of the PC/server terminal 101 are set to the "transmission destination" 511. A "scan/transmission setting" 512 displays each state of a color setting of an image to be generated, a format setting of an image file to be generated, and a document type setting. Further, an "other function" 513 is a button for setting an application function that is not displayed on the "scan-and-transmit" setting UI 510.

In step S402, the image processing apparatus 100 receives a setting instruction on a basic setting item that is settable on the "scan-and-transmit" setting UI 510. Examples of a setting receivable in step S402 include a color setting of an image to be generated and a format of an image file to be generated. The image processing apparatus 100 receives a tap operation on the "transmission destination" 511 or the "scan/transmission setting" 512 and receives input of a setting item corresponding to each tap operation.

In step S403, the image processing apparatus 100 stores, in the RAM 118 of the image processing apparatus 100, a setting value relating to the basic setting specified by the user instruction in step S402.

Next, in step S404, the "other function" 513 is selected by a user tap operation.

Figure 4C:
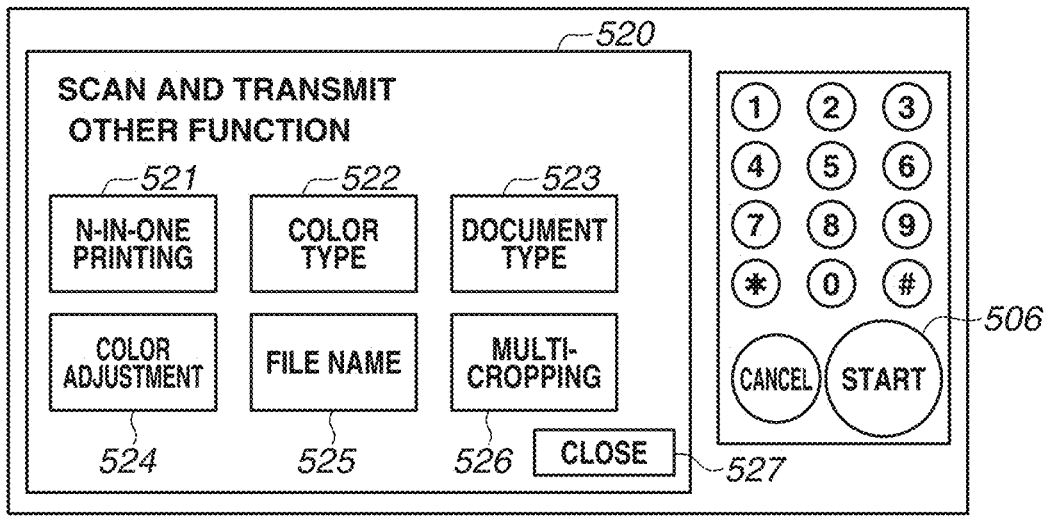

In step S405, the image processing apparatus 100 receives selection of the "other function" 513 from the user via the setting UI 510 and displays an application function setting screen on the display/operation unit 121. FIG. 4C illustrates an example of an "other function" setting UI 520 for setting an application function. The "other function" setting UI 520 displays buttons for setting various application functions of the "scan-and-transmit" function executable by the image processing apparatus 100. The "other function" setting UI 520 displays, for example, an "N-in-one printing" button 521, a "color type" button 522, a "document type" button 523, a "color adjustment" button 524, a "file name setting" button 525, and a "multi-cropping" button 526. The "multi-cropping" button 526 is a button for inputting an instruction to extract a document image corresponding to each document from images generated by scanning a plurality of documents placed next to one another on a glass platen. In the present exemplary embodiment, the "other function" setting UI 520 also displays a setting item that is also a setting item settable on the setting UI 510. Alternatively, the "other function" setting UI 520 can be configured to display a setting item other than a setting item settable on the setting UI 510.

In step S406, the "multi-cropping" button 526 in the "other function" setting UI 520 is tapped by the user.

Figure 4D:
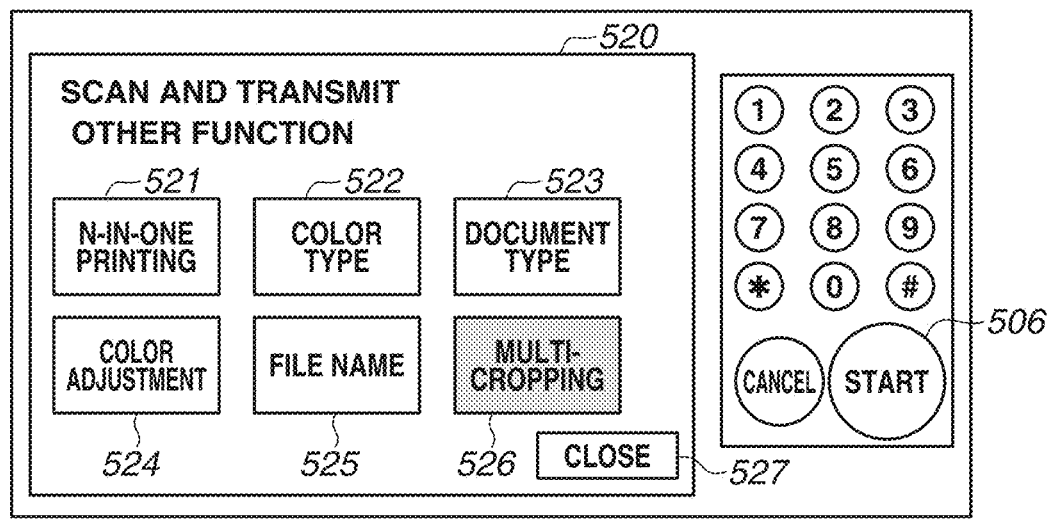

If the user selects the "multi-cropping" button 526, then in step S407, the image processing apparatus 100 sets a multi-cropping processing flag, which indicates that multi-cropping processing is to be executed, to ON. The multi-cropping processing flag is stored in the RAM 118. Further, in step S407, the image processing apparatus 100 displays, on the display/operation unit 121, a screen 520 which indicates that multi-cropping illustrated in FIG. 4D is selected. If the user selects the "multi-cropping" button 526, the color of the "multi-cropping" button 526 on the "other function" setting UI 520 is reversed, and a screen that indicates that the multi-cropping processing is set to on is displayed. In the present exemplary embodiment, the processing performed in the case in which the multi-cropping processing is set to on will be described. If the user taps and selects a "close" button 527 on the "other function" setting UI 520, the display/operation unit 121 displays the "scan-and-transmit" setting UI 510 illustrated in FIG. 4B.

In step S408, the user selects a start key 506 to input an instruction to execute the "scan-and-transmit" function. If the start key 506 is pressed, the image processing apparatus 100 determines that an instruction to start reading a document is issued. If the press of the start key 506 is received, the image processing apparatus 100 sets various settings for scanning a document in the RAM 118 and starts preparing for document reading processing.

First, in step S409, the image processing apparatus 100 sets a parameter for use in luminance gain adjustment in the RAM 118. The luminance gain adjustment is the processing of adjusting the luminance of an image acquired by the scanner unit 120 by reading a document. In the case in which the multi-cropping processing flag is set to ON in step S407, the image processing apparatus 100 sets, in the RAM 118, a parameter different from the parameter set in the case in which the multi-cropping processing is set to off.

In step S410, the image processing apparatus 100 causes the scanner unit 120 to drive the scanner and read a document placed on the glass platen.

In step S411, the image processing apparatus 100 converts the image read in step S410 into an image in a bitmap format that is processible in the image processing. For example, in step S411, the image processing apparatus 100 converts a luminance signal value input from the scanner unit 120 into an 8-bit digital signal. Further, the image processing apparatus 100 performs shading correction on the converted luminance signal value. The shading correction is the correction processing performed on the input luminance signal value to eliminate various distortions that occur in an illumination system, image forming system, and image capturing system of the scanner unit 120. Thereafter, the image processing apparatus 100 performs luminance gain adjustment on the luminance signal value having undergone the shading correction using the setting value set in step S409. In the luminance gain adjustment in the case in which multi-cropping processing is executed, an image in which information about signal values on the high luminance side is preserved is generated, compared to a normal scan image generated in the case in which multi-cropping processing is not executed. In the normal scan image, a luminance signal value after the shading correction is treated as white (i.e., luminance value 255) to prevent uneven white luminance in the case in which the luminance signal value is higher than predetermined reference value, whereas in the case of executing multi-cropping processing, the luminance gain adjustment is performed so as to output, as different values, luminance signal values on the high luminance side. The image processing apparatus 100 further performs image quality adjustment processing, such as color balance adjustment, background density removal, sharpness processing, and contrast adjustment, and stores the image as data in the HDD 119.

FIG. 5A is a schematic view illustrating a state in which a plurality of documents is placed on a glass platen. In FIG. 5A, three documents are arranged on the scanner unit 120 capable of reading a region having an A3-size area. As an example of documents to be placed, a standard-size document (e.g., A4-size invoice) and a plurality of non-standard-size documents (e.g., receipts) are placed next to each other on the glass platen. The type, number, and arrangement of documents to be placed on the glass platen are not limited to those described above.

Figure 6A:
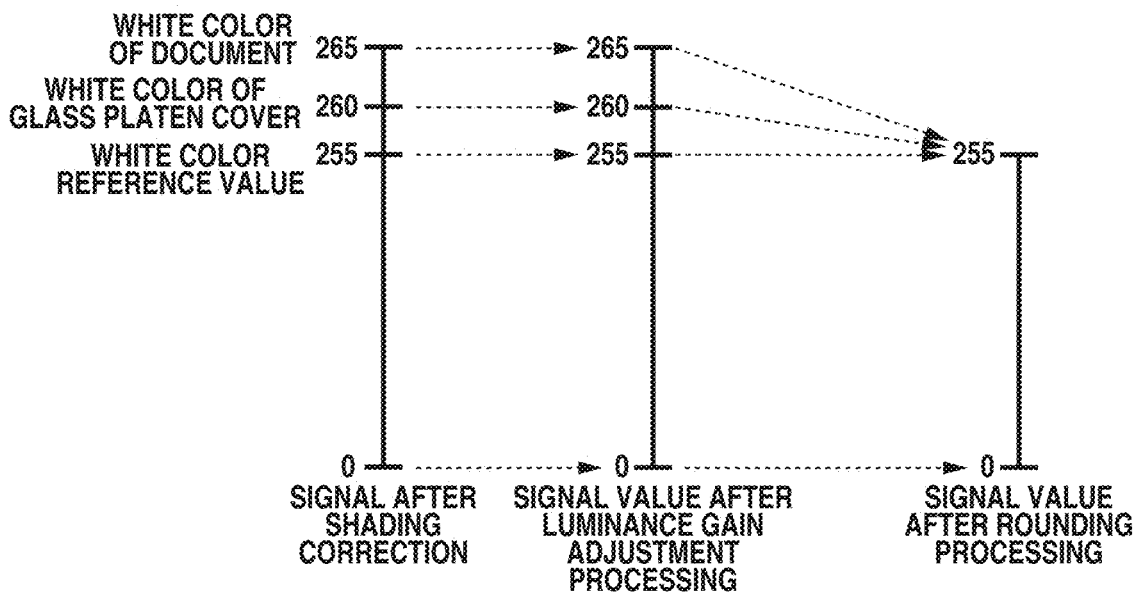
FIGS. 6A and 6B are schematic views illustrating normalization processing using gain adjustment according to the first exemplary embodiment of the disclosure.

FIG. 5B illustrates an image generated in a case in which the multi-cropping processing is set to off and the image processing apparatus 100 performs processing using a luminance gain adjustment parameter at the time of image forming which is set to a standard value. FIG. 6A is a schematic view illustrating luminance gain adjustment in the case in which the multi-cropping processing is set to off. In the case in which the multi-cropping processing is set to off, every region having a higher luminance value having undergone shading correction than a white color reference value (255) is output as a white color reference value (255). Thus, as illustrated in FIG. 5B, a white portion of the documents and a white portion of the glass platen cover are both output as white of the same luminance. In this case, since the backgrounds of documents A and C are white, there is no longer a difference between the white portions of the backgrounds of the documents and the white portion of the glass platen cover, so that it is difficult to detect the boundaries of the documents.

Figures 5C, 5D:
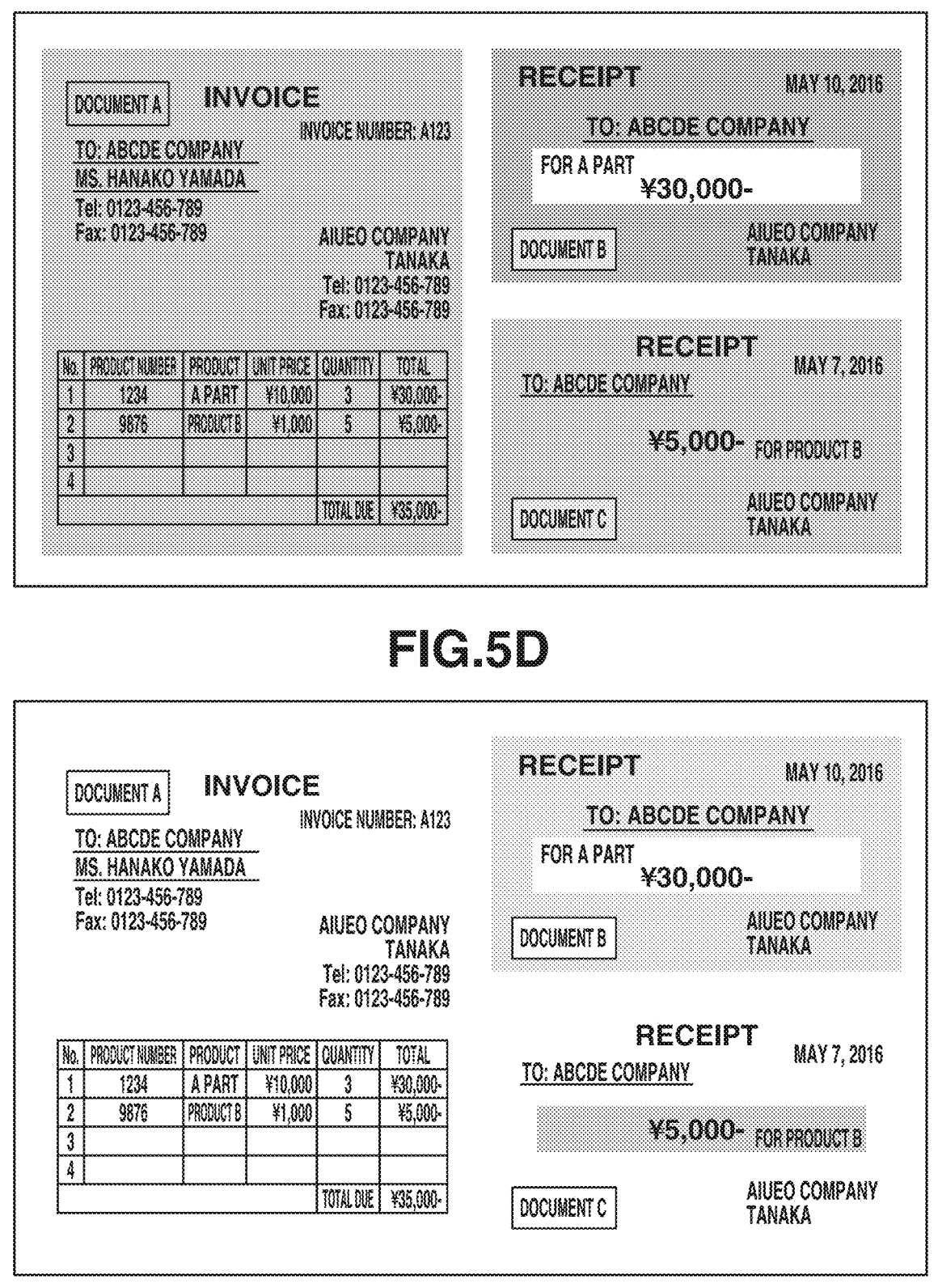
Figure 6B:
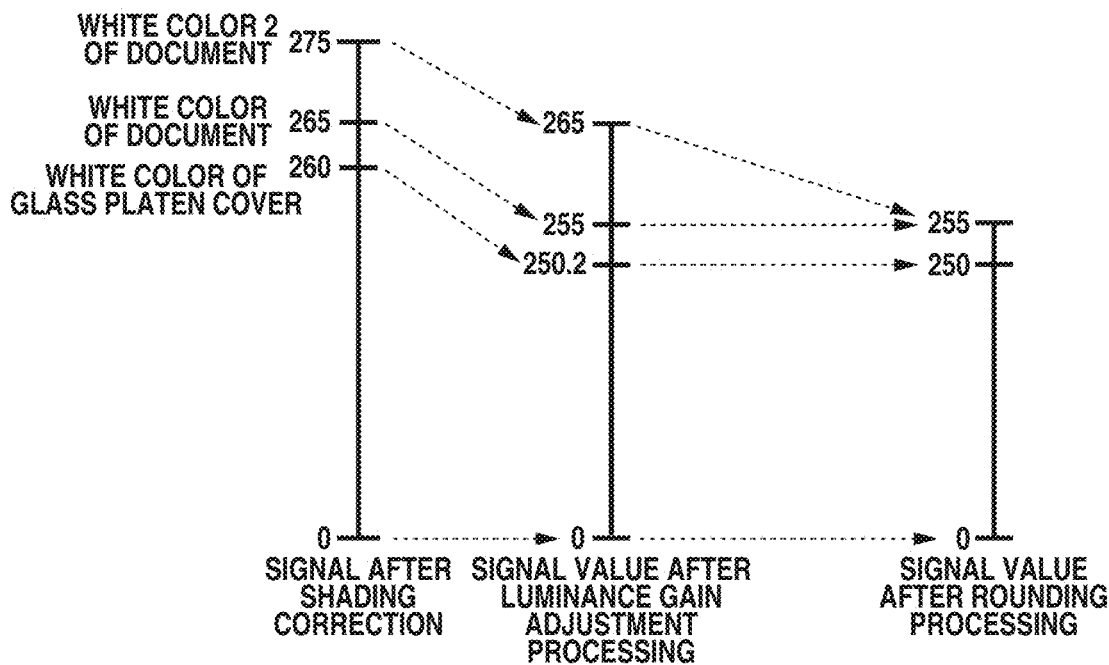

FIG. 5C illustrates an example of an image in a case in which the multi-cropping processing is set to on, the luminance gain adjustment parameter at the time of image forming is set to a value different from the standard value, and the image processing apparatus 100 performs processing in a state such that signal values on the high luminance side are preserved. FIG. 6B is a schematic view illustrating the luminance gain adjustment in the case in which the multi-cropping processing is set to on. In the case in which multi-cropping processing is set to on, the shading corrected luminance is multiplied by a predetermined gain adjustment parameter, and the obtained value is output. For example, in FIG. 6B, the image processing apparatus 100 multiplies a signal value after shading correction, i.e., a white value of 260, by the luminance gain adjustment parameter and outputs the obtained value to be a luminance value 250. As illustrated in FIG. 6B, in the case in which multi-cropping processing is set to on, the signal values on the high luminance side are converted into low luminance values by the luminance gain adjustment parameter, compared to an image generated in the case in which the multi-cropping processing is set to off. Thus, in the case in which multi-cropping processing is set to on, an output image is entirely darker than that in the case in which the multi-cropping processing is set to off, but the white color of the documents and the white color of the glass platen cover are more likely to be output at different luminance values to facilitate detection of the boundaries of the documents.

In step S412, the image processing apparatus 100 acquires the image on which the luminance gain adjustment has been performed and stored in the HDD 119 in step S411. The CPU 111 of the image processing apparatus 100 detects the coordinates of four vertexes based on the edges of the documents contained in the acquired image, outputs the values of the detected coordinates of the four vertexes of the documents, and stores the values in the RAM 118. Details of the multi-cropping coordinate detection processing executed in step S412 will be described below.

In step S413, the image processing apparatus 100 performs image luminance adjustment processing to adjust the luminance values of the image generated in step S411 to appropriate luminance values for an image to be transmitted. The image generated in step S411 is entirely dark, as illustrated in FIG. 5C, in order to increase the accuracy of multi-cropping coordinate detection. The image processing apparatus 100 digitally converts the luminance of the image on which the luminance gain adjustment has been performed using the setting value for multi-cropping into an equivalent luminance to that of the image on which the luminance gain adjustment has been performed using the standard value as illustrated in FIG. 5B, and stores the resultant image in the HDD 119. Details of the image luminance adjustment processing will be described below. That is, if the processing to increase the entire luminance of the image for multi-cropping is performed in step S413, the image is converted into an image having an equivalent brightness to that of the image scanned using the normal setting and the converted image is used as an image for transmission.

In step S414, the image processing apparatus 100 executes image cropping processing to extract partial images of the regions respectively corresponding to the documents from the image data having undergone the digital conversion processing in step S413 and stored in the HDD 119. The image processing apparatus 100 crops the partial images of the regions respectively corresponding to the documents from the image converted in step S413 based on the coordinate values of the four vertexes of the documents that are detected in step S412 and performs an affine transformation such as inclination correction to acquire a rectangle document image. The image processing apparatus 100 compresses the document images of the cropped documents and stores the compressed images in the HDD 119.

Figure 4E:
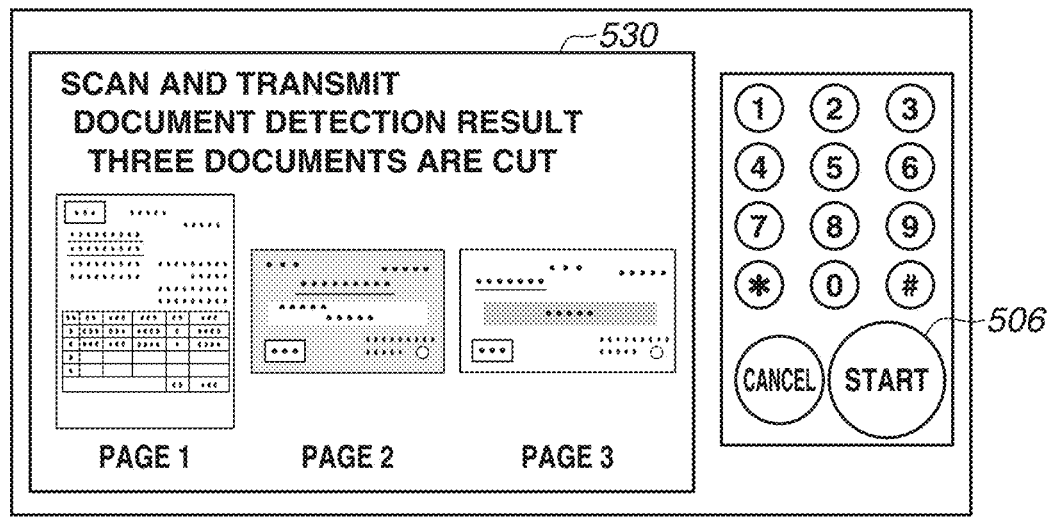

In step S415, the image processing apparatus 100 displays the images of the documents on which multi-cropping processing has been performed on a multi-cropping processing result UI screen of the display/operation unit 121. FIG. 4E illustrates an example of a screen displayed on the display/operation unit 121 to show the result of multi-cropping processing. A "document detection result" UI 530 is a screen on which the images cropped by the multi-cropping processing are arranged.

In step S416, the user checks the cropping result images displayed on the display/operation unit 121 and then issues an instruction to store and transmit the displayed document images. In other words, if the user presses the start key 506, the image processing apparatus 100 determines that an instruction to store and transmit the displayed document images is issued.

In step S417, the image processing apparatus 100 transmits the cropped document images to the PC/server terminal 101, which is the transmission destination set in the "transmission destination" 511 in FIG. 4B. The image file to be transmitted to the PC/server terminal 101 is converted into a file of a format and name set in the "scan-and-transmit" setting UI 510 and the "other function" setting UI 520.

In step S418, the PC/server terminal 101 stores the image file of the multi-cropped documents that is transmitted from the image processing apparatus 100. While the PC/server terminal 101 can simply store the received image file, the PC/server terminal 101 can alternatively, for example, perform character recognition processing such as optical character recognition (OCR) processing on the image file and store the image file after adding the processing result thereto. This makes it possible to increase the image searchability and register information extracted from the image in the system.

If the user issues an instruction to display the document images to the PC/server terminal 101 in step S419, then in step S420, the PC/server terminal 101 displays the document images for which the display instruction is issued by the user. In the case in which the processing such as OCR processing is performed on the images stored in the PC/server terminal 101, the PC/server terminal 101 can display the result of OCR processing in step S420. While a case in which the user directly operates the PC/server terminal 101 to input a viewing instruction and the stored images are displayed on a display unit of the PC/server terminal 101 is described, the present exemplary embodiment is not limited to the case. For example, in a case in which the user operates the mobile terminal 103 and transmits a viewing request to the PC/server terminal 101, the images can be transmitted from the PC/server terminal 101 to the mobile terminal 103 and displayed thereon.

<Software Configuration of "Scan-and-Transmit" Function>

FIG. 7 is a flowchart illustrating a process executed by the image processing apparatus 100 in the case in which the multi-cropping processing is set to on in the "scan-and-transmit" function. The CPU 111 executes a control program stored in the ROM 117 or the HDD 119 to thereby realize the process described below.

The process illustrated in FIG. 7 is executed if the start key 506 is pressed in the state in which the multi-cropping processing is set to on.

In step S600, the CPU 111 reads a parameter for executing luminance gain adjustment from the ROM 117 and stores the parameter in the RAM 118. The parameter to be used in the luminance gain processing in the case in which the multi-cropping processing is set to on is stored in advance in the ROM 117.

In step S601, the CPU 111 controls the scanner unit 120 via the scanner I/F unit 114 and scans documents.

In step S602, the CPU 111 executes luminance gain adjustment on the images acquired by scanning the documents in step S601 using the parameter acquired in step S600. Details of the luminance gain adjustment executed in step S602 will be described below. In step S602, the CPU 111 performs shading correction prior to luminance gain adjustment and normalizes the luminance of the image based on a predetermined white color reference. Further, after the luminance gain adjustment, the CPU 111 converts the image luminance into a standardized RGB signal such as sRGB. At this time, conversion processing is performed using a three-dimensional lookup table (LUT) or one-dimensional LUT. After the processing of step S602 is executed, the image on which luminance gain adjustment has been performed (image suitable for multi-cropping processing), as illustrated in FIG. 5C, is stored in the RAM 118.

In step S603, the CPU 111 detects the coordinates to be cropped on the image on which luminance gain adjustment has been performed in step S602. The CPU 111 detects straight lines of the edges of the documents using the luminance-gain-adjusted image as an input image and detects the coordinates of the four vertexes of each of the documents based on rectangles of the documents surrounded by the straight lines of the edges. The processing executed by the CPU 111 in step S603 will be described below with reference to FIG. 9. The image processing apparatus 100 identifies regions in the image that correspond to the documents based on the coordinates detected in step S603.

In step S604, the CPU 111 generates an image having luminance suitable for transmission by re-adjusting the luminance of the image on which the luminance gain adjustment has been performed in step S602 (image suitable for multi-cropping processing). In step S604, the CPU 111 executes processing so as to increase the brightness of the entire luminance-gain-adjusted image. The CPU 111 executes the processing of step S604 to thereby generate the image illustrated in FIG. 5D and stores the generated image in the RAM 118. Details of the processing executed in step S604 will be described below with reference to FIG. 11.

In step S605, the CPU 111 performs image cropping using the coordinates detected in step S603 and the image on which luminance adjustment has been performed in step S604. In step S605, the CPU 111 crops partial images corresponding to the regions of the documents from the luminance-adjusted image based on the four vertexes of each of the documents that are detected in step S603. Then, the CPU 111 stores the cropped images in the RAM 118. Details of step S605 will be described below with reference to FIG. 14.

In step S606, the CPU 111 displays the cropped images on the display/operation unit 121, as illustrated in FIG. 4E.

In step S607, the CPU 111 determines whether a transmission instruction is received from the user. A transmission instruction from the user is received if the start key 506 is pressed by the user. If no transmission instruction is received from the user (NO in step S607), the CPU 111 continues to execute the processing of step S607. On the other hand, if a transmission instruction is received from the user (YES in step S607), the processing proceeds to step S608.

In step S608, the CPU 111 transmits the cropped images to the PC/server terminal 101. The CPU 111 transmits the cropped images to the user-designated transmission destination. Although the images are transmitted to the PC/server terminal 101, which is an external apparatus, in the present exemplary embodiment, the cropped images can be stored in the storage apparatus 112 of the image processing apparatus 100. In the case of storing the cropped images in the storage apparatus 112, the user designates the address of a storage destination folder of the storage apparatus 112 as a transmission destination of the cropped images.

In the above example, a transmission instruction from the user is waited in step S607 in FIG. 7. Alternatively, an instruction to retry scanning and document detection can be received from the user besides a transmission instruction in step S607. For example, the image processing apparatus 100 displays a retry button (not illustrated) on the "document detection result" display UI 530 in FIG. 4E. If the user taps the retry button, the processing returns to step S600. In such a way, scanning is promptly retried in a case in which a cropping result is different from what the user has expected. Although the luminance gain adjustment parameter set by the CPU 111 in step S600 can have the same value, scanning can be performed using a changed value of the luminance gain adjustment parameter. For example, the value of the luminance gain adjustment parameter can be increased according to the number of retries. Further, in a case in which one of the displayed document images is selected by the user and an instruction to modify the document cropping position is issued in step S607 in FIG. 7, an image from which the document image is cropped can be displayed (or a region around the document image can be enlarged and displayed) so that the user can manually modify the cropping position.

<Luminance Gain Adjustment Processing>

Next, details of the luminance gain adjustment processing executed in step S602 in FIG. 7 will be described.

Figure 8:
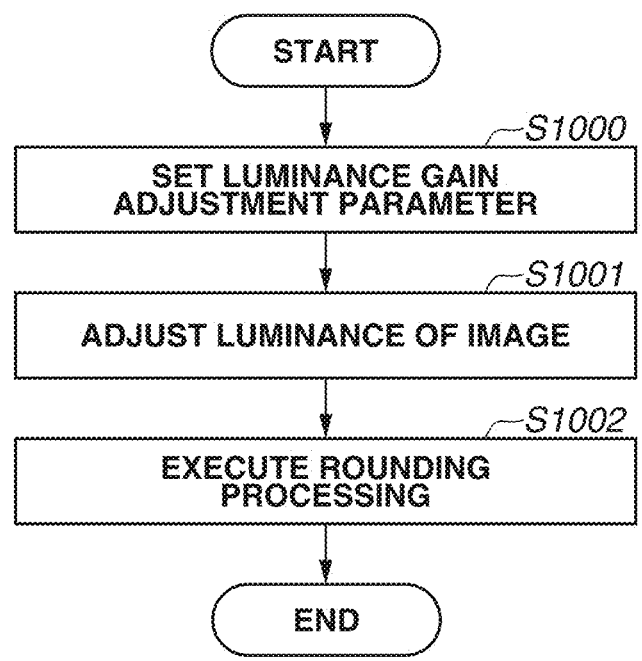
FIG. 8 is a flowchart illustrating an entire image processing function according to the first exemplary embodiment of the disclosure.

FIG. 8 is a flowchart illustrating a process that is executed by the CPU 111 in the luminance gain adjustment in step S602. A program for executing the process illustrated in FIG. 8 is stored in the storage apparatus 112 such as the ROM 117 or the HDD 119. The CPU 111 executes the program stored in the ROM 117 or the HDD 119 to realize the process. The luminance gain adjustment processing is executed in both a case in which the multi-cropping processing is on and a case in which the multi-cropping processing is off, except that parameter values to be used in luminance gain adjustment processing differ between the cases.

In step S1000, the CPU 111 reads the parameter for use in the luminance gain adjustment from the ROM 117 and sets the read parameter to the RAM 118. The parameter that is used in the case in which the multi-cropping processing is set to on is larger than the parameter that is used in the case in which the multi-cropping processing is set to off. For example, in the present exemplary embodiment, the luminance gain adjustment parameter in the case in which the multi-cropping processing is set to off is 255, whereas the luminance gain adjustment parameter in the case in which the multi-cropping processing is set to on is 265. The parameter for use in the luminance gain adjustment is stored in advance in the ROM 117 and is a value set in the image processing apparatus 100 at the factory before shipment. The parameter for use in the luminance gain adjustment can be reset by a serviceman after shipment.

In step S1001, the CPU 111 adjusts the luminance normalized based on the white color reference of the image acquired by scanning, using the luminance gain adjustment parameter stored in the RAM 118 in step S1000. In step S1001, the CPU 111 executes luminance gain adjustment using formula 1 specified below. In formula 1, d is a signal value of an RGB signal output from a charge-coupled device (CCD) sensor of the scanner. Formula 1 indicates that the signal value is converted into a signal value normalized based on the white color reference. As used herein, the term "white color reference" refers to a reference for determining at which white level a signal value is adjusted to the luminance level of 255 in the output image. A signal value at which the luminance value obtained after the luminance gain adjustment is performed in the case in which the multi-cropping processing is off is 255 is adjusted such that the luminance value is a darker value than 255 in the luminance gain adjustment in the case in which the multi-cropping processing is on. In formula 1, d' is a signal value obtained as a result of luminance gain adjustment. As described above, the processing for adjusting the luminance of the image in step S1001 linearly converts the luminance of each pixel of the image. In the present exemplary embodiment, the luminance gain adjustment parameter in the case in which the multi-cropping processing is set to off is 255, thereby the processing is substantially equivalent to through processing. This is because the signal has been already normalized based on the white color reference. The luminance gain adjustment parameter can be changed as needed.

$$d' = d \times \frac{255}{\text{luminance gain adjustment parameter}} \quad \text{(formula 1)}$$

The processing performed in step S1001 will be described below with reference to schematic views illustrated in FIGS. 6A and 6B. FIG. 6A illustrates the case in which the multi-cropping processing is set to off, whereas FIG. 6B illustrates the case in which multi-cropping processing is set to on. The CPU 111 acquires the output of the CCD sensor, normalizes the output so as to set the white color reference to 255 (shading-corrected signal), and then calculates an adjusted signal value using formula 1. For example, in the case in which the multi-cropping is set to off and the shading-corrected signal value is 260, the signal value is 260 after the luminance gain adjustment. On the other hand, in the case in which multi-cropping processing is set to on and the shading-corrected signal value is 260, the signal value is 250.2 after the luminance gain adjustment. As described above, in the case in which multi-cropping processing is set to on, the luminance-gain-adjusted signal value is lower than that in the case in which the multi-cropping is set to off, and a generated image is entirely darker than a normal image.

In step S1002, the CPU 111 executes processing on the signal value after the luminance gain adjustment. In step S1002, the CPU 111 replaces, by 255, every signal value in a range where the signal value after the luminance gain adjustment is 255 or more. For example, in the case in which the multi-cropping set to on, if the signal value after the shading correction is 275, the signal value after the luminance gain adjustment is 265. The CPU 111 executes rounding processing on the signal value in the range to change the signal value from 265 to 255 in step S1002. In this way, the CPU 111 replaces the luminance of a portion that is brighter than a certain luminance in an image with a predetermined luminance, and outputs the image. Further, in step S1002, the CPU 111 rounds a value off to the closest whole number.

The rounding processing executed in step S1002 will be described with reference to FIGS. 6A and 6B again. A number specified in parentheses regarding a luminance value is a signal value obtained after the luminance gain adjustment. The CPU 111 replaces an output signal of a portion where the luminance-gain-adjusted value exceeds 255 with 255. For example, in FIG. 6A, the white color (260) of the glass platen cover and the white color (265) of the document after the luminance gain adjustment are each replaced with 255. In FIG. 6B, the white color (255) of the document after the luminance gain adjustment is output as 255, whereas the white color (265) of the second document is replaced with 255.

In the case in which the multi-cropping processing is set to off, the white color (260) of the glass platen cover and the white color (265) of the document are each replaced with 255. On the other hand, in the case in which the multi-cropping processing is set to on, the white color 260 of the glass platen cover and the white color 265 of the document are respectively converted into (250.2) and (255) by the luminance gain adjustment, so that there arises a difference between the luminance values on which the rounding processing has been performed. This makes it possible to detect the edges of the documents that are not detectable by normal scanning. While the luminance gain adjustment parameter in the case in which the multi-cropping processing is set to on is set to 265 in the present exemplary embodiment, the luminance gain adjustment parameter can be set to a darker value.

<Method of Multi-Cropping Coordinate Detection Processing>

Next, a process of detecting the coordinates of the four vertexes of each document from the image obtained after the luminance gain adjustment executed in step S603 in FIG. 7 will be described with reference to FIG. 9. A program for executing the process illustrated in FIG. 9 is stored in the ROM 117 or the HDD 119. The CPU 111 reads and executes the program to thereby realize the process.

There are various methods for coordinate detection processing to perform multi-cropping. Here, a typical method in which a contour is detected and a rectangle having four vertexes is detected based on the detected contour will be described below. Alternatively, any other method can be used to extract a document contour and determine a region to be cropped.

In step S700, the CPU 111 develops, onto the RAM 118, the luminance-gain-adjusted image which is stored in the HDD 119. The CPU 111 develops, onto the RAM 118, the luminance-gain-adjusted image, that is compressed in Joint Photographic Experts Group (JPEG) format and stored in the HDD 119. In step S700, the luminance-gain-adjusted image which is illustrated in FIG. 5C is developed onto the RAM 118.

In step S701, the CPU 111 converts the image developed in step S700 into an image needed for document coordinate detection processing. Examples of the processing executed by the CPU 111 in step S701 include graying conversion, in which a three-channel RGB image is converted into a single-channel gray image, and resolution reduction processing. The processing in step S701 is processing for increasing the speed of subsequent processing and can be skipped.

In step S702, the CPU 111 extracts an edge component from the image generated in step S701 and generates an edge portion image. The processing executed in step S702 can be realized by a publicly-known method for extracting an edge component of a document and is realized by, for example, a method described below.

An edge portion is extracted using a Sobel method, Prewitt method, or Roberts Cross method for estimating a gradient of the image luminance. Further, a Canny method in which the continuity of the luminance gradient of the image is taken into consideration can be also used. Further, an edge can be detected by performing not only the edge extraction processing but also locally adaptive binarization processing to perform locally-different threshold value processing. Further, in step S702, the CPU 111 can execute one of the above-described methods or perform a plurality of processing and perform a logical AND operation (AND operation) on the processing results to extract a document edge In step S703, the CPU 111 removes, from the edge portion image of the image that is generated in step S702, an isolated point formed by a cluster of about several pixels. A small cluster of about several pixels is usually not an edge portion of a document but noise. Thus, in order to remove noise that can cause an erroneous judgement in subsequent processing such as contour detection processing, the CPU 111 removes such a small cluster of several pixels in an edge portion.

In step S704, the CPU 111 executes line segment connecting processing on the edge portion image from which the isolated point is removed. If the gradient of the luminance of the edge portion of the document is not uniform, a contour line in the edge portion image may be disconnected. In step S703, the CPU 111 executes straight line connecting processing to connect disconnected contour lines. The processing executed in step S703 is a publicly-known method. For example, the line segments are connected using the Hough transform. Further, the line segment can be connected using image expansion processing. FIG. 10A illustrates an image obtained as a result of execution of steps S701 to S704. An image 800 surrounded by the points {0, 0}, {X, 0}, {0, Y}, and {X, Y} indicates an entire scan image.

In step S705, the CPU 111 extracts a contour surrounded by the edge portions from the generated edge portion image. The CPU 111 detects a contour while checking the connectivity of the pixels specifying the edge portion. Further, the CPU 111 acquires the coordinates of each inflection point of the contour at which the direction of a curved line of a contour line changes.

In step S706, the CPU 111 detects a rectangle from the image using the coordinates of the inflection point detected in step S705. The CPU 111 detects a rectangle surrounded by the coordinates of the inflection points detected in step S705 and a continuous edge line. A method for the detection is, for example, a method in which a circumscribed rectangle of an object which is formed by connecting edge lines is detected.

In step S707, the CPU 111 selects a rectangle corresponding to an edge portion of the document from the rectangles detected in step S706. For example, in a case in which a document A in FIG. 10A is scanned, a rectangle specifying the edge portion of the document and a plurality of rectangles forming a table printed in the document A are detected. Thus, a rectangle that forms an edge of the document A from the plurality of rectangles is selected. In step S707, the CPU 111 determines only the outermost rectangle among the plurality of rectangles as a valid rectangle and determines a rectangle contained in another rectangle as an invalid rectangle. In this way, a rectangle formed by the sheet of the document is determined as a valid rectangle, whereas a rectangle such as a table or diagram in the document is determined as an invalid rectangle.

In step S708, the CPU 111 transforms the coordinates of the vertexes of the valid rectangle into coordinates in input image size in the case in which the image size is reduced in step S701. Step S708 is skipped in the case in which the image size is not converted in step S701.

In step S709, the CPU 111 stores the coordinates of the four vertexes of each document in the HDD 119. The storage destination of the coordinate data can be anywhere in the storage apparatus 112.

Figure 10B:
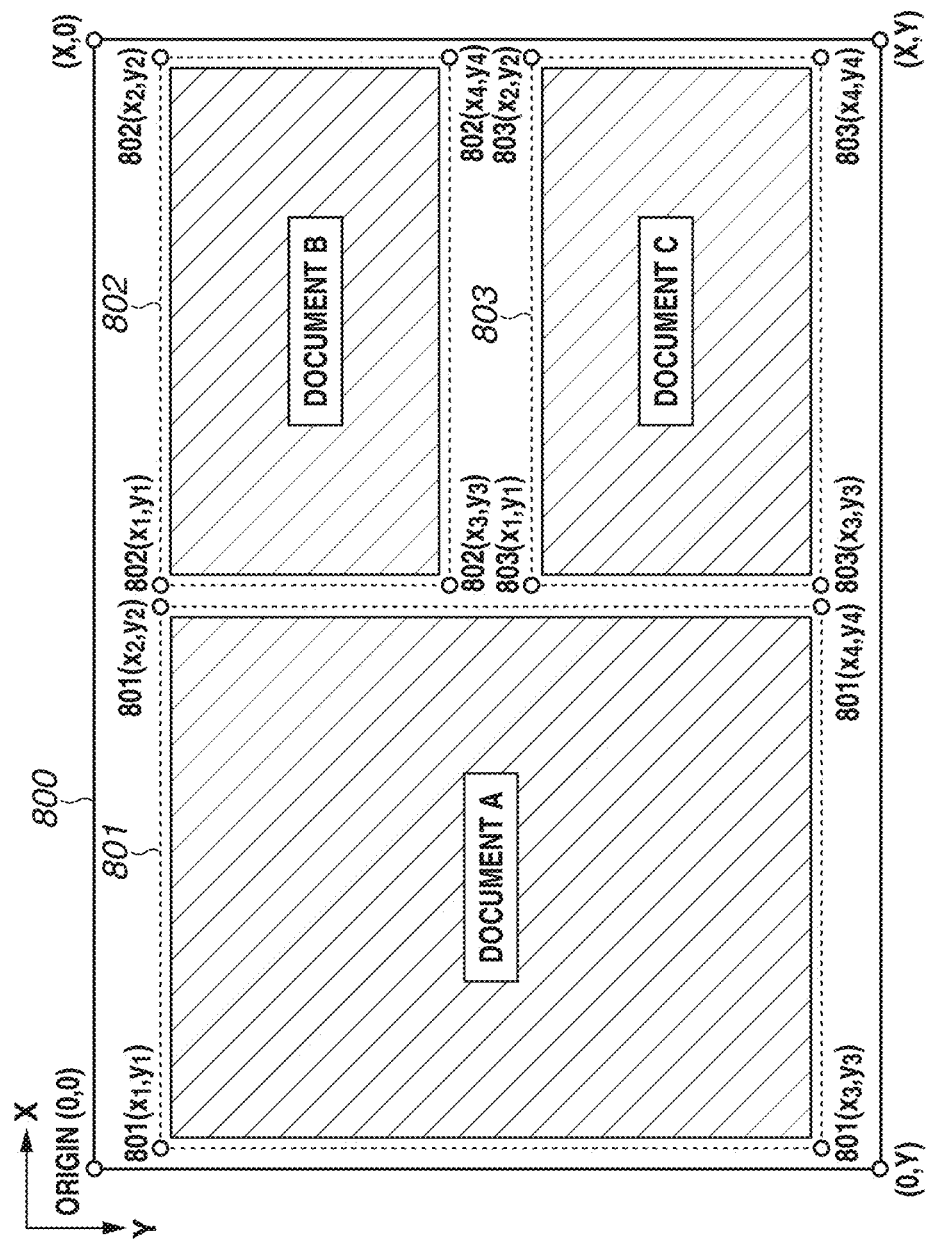

FIG. 10B is a schematic view illustrating the detected coordinates of the four vertexes of each document. FIG. 10B illustrates an image having a width of X pixels and a height of Y pixels with the upper left end being the origin. In the image 800, images 801, 802, and 803 respectively correspond to the documents A, B, and C. The image 800 is divided into the images 801 to 803 respectively corresponding to the documents A to C by the processing in steps S700 to S709, and the coordinate values of the four vertexes of each image are acquired. In the case of the image 801 (document A) in the present exemplary embodiment, the coordinate values 801 $\{x_1, y_1\}$, 801 $\{x_2, y_2\}$, 801 $\{x_3, y_3\}$, and 801 $\{x_4, y_4\}$ of the four vertexes of the image 801 are acquired. The four vertexes are acquired for the number of acquired documents (801 $\{x_i, y_i\}$ to 803 $\{x_i, y_i\}$: (i=1 to 4)).

<Method for Image Luminance Adjustment Processing>

Figure 11:
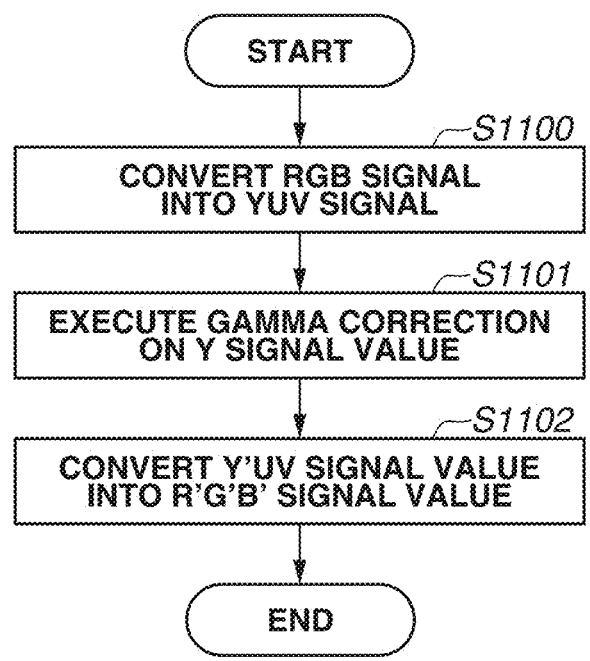
FIG. 11 is a flowchart illustrating a luminance adjustment process according to the first exemplary embodiment of the disclosure.

Next, the image luminance adjustment processing executed by the CPU 111 in step S604 in FIG. 7 will be described with reference to FIG. 11. A program for executing the process illustrated in FIG. 11 is stored in the ROM 117 or the HDD 119. The CPU 111 executes the control program stored in the ROM 117 or the HDD 119 to thereby realize the process.

The image having undergone the luminance gain adjustment in step S602 in FIG. 7 is entirely darker than a normal scan image and is not suitable for use as an image to be stored/transmitted. Thus, in step S604, the CPU 111 generates an image to be stored and transmitted with increased brightness of the image. While a level to which the luminance of the image is to be increased can be set arbitrarily, the luminance may be increased to the same level as that in the case in which the multi-cropping processing is set to off.

In the image luminance adjustment processing, a method to be used is not limited to a particular method, and any method can be used as long as the luminance of the entire image can be increased. Three methods will be described below as examples. In the present exemplary embodiment, the luminance of the image is adjusted using one of the three methods.

The first method is a method of correction to increase the luminance of the image using gamma correction processing. FIG. 11 is a flowchart illustrating a flow of image luminance adjustment processing. A program for realizing the process illustrated in FIG. 11 is stored in the ROM 117 or the HDD 119, and the CPU 111 reads and executes the program to thereby realize the process.

In step S1100, the CPU 111 converts an image signal value from an RGB color space into a YUV color space. While the converted color space is the YUV color space in step S1100, the converted color space can be any color space defined by luminance and color difference, such as a YCbCr color space.

In step S1100, the CPU 111 executes conversion from RGB to YUV using formulas 2 below:

$Y=0.299\times R+0.587\times G+0.114\times B,$ $U=-0.169\times R-0.331\times G+0.500\times B,$ and $V=0.500\times R-0.419\times G-0.081\times B.$ In step S1101, the CPU 111 executes gamma correction processing so as to increase the luminance of a Y signal which is a luminance signal. The CPU 111 corrects the signal value of the Y signal after conversion using formula 3 below.

$$Y' = 255 \times \left(\frac{Y}{255}\right)^{\left(\frac{1}{\gamma}\right)},$$

where $\gamma>1.0$

Figure 12:
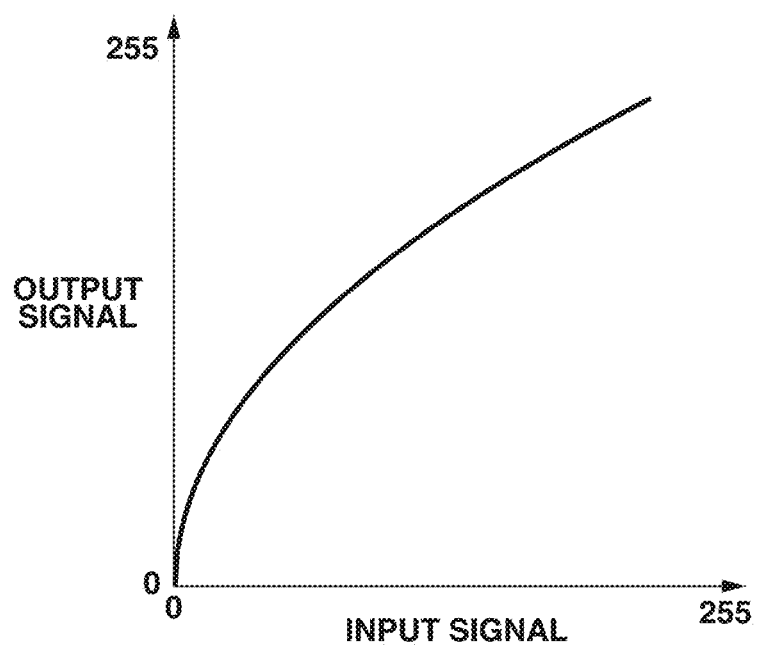
FIG. 12 illustrates the luminance adjustment process according to the first exemplary embodiment of the disclosure.

FIG. 12 illustrates a conversion table in a case in which the gamma value is 2.0. The gamma value is determined based on the value of the luminance gain adjustment parameter in the case in which the multi-cropping processing is set to on. Specifically, the value is determined based on a setting of darkness to which the image is to be adjusted at the time of executing luminance gain adjustment. The gamma value is stored in advance in the ROM 117 or the HDD 119. In FIG. 12, the horizontal axis represents an input signal, whereas the vertical axis represents an output signal. The processing in step S1101 is executed to thereby make a correction to increase the brightness of the entire image.

In step S1102, the CPU 111 calculates R, G and B' values using the corrected Y' signal value in step S1101 and the converted U and V values in step S1100. The CPU 111 converts the YUV signal into an RGB signal using formulas 4 below. The CPU 111 stores the corrected image in the HDD 119.

$R'=1.000\times Y'+1.402\times V$ $G'=1.000\times Y'-0.344\times U-0.714\times V$ $B'=1.000\times Y'+1.772\times U$ Formulas 4:

The process illustrated in FIG. 11 is executed to thereby make a correction to increase the luminance of the entire image generated in step S602 in FIG. 7. FIG. 5D illustrates an image acquired by executing the process using the image illustrated in FIG. 5C as an input image, and the luminance of the image in FIG. 5D is close to the luminance of the image in FIG. 5B which is an image acquired with the standard luminance. In this way, a bright image suitable for storage is acquired from an image corrected to be entirely dark, in order to facilitate extraction of an edge portion of the document. In the above-described method, the RGB value is converted into the color space defined by luminance and color difference, and only the luminance signal is adjusted. In this way, even after the luminance of the image is increased, the color differences contained in the image are preserved.

The second method is a method for image luminance adjustment that is simpler than the first method. In the second method, the luminance of the image is increased without executing conversion from the RGB space into another color space. The CPU 111 acquires an RGB signal and converts the acquired RGB signal into an R', G' and B' signals using formulas 5 below:

$$R' = 255 \times \left(\frac{R}{255}\right)^{\left(\frac{1}{\gamma}\right)},$$

where γ>1.0, $$G' = 255 \times \left(\frac{G}{255}\right)^{\left(\frac{1}{\gamma}\right)},$$

where γ>1.0, and $$B' = 255 \times \left(\frac{B}{255}\right)^{\left(\frac{1}{\gamma}\right)},$$

where γ>1.0.

The above-described conversion formula enables conversion while the luminance of the entire image is increased.

The above-described method of correction to increase the luminance of the image using the gamma correction processing makes it possible to convert the brightness of a scan image to brightness equivalent to normal brightness in the scan image which is scanned with a darker setting than a normal setting. However, there is a case in which a setting is made beforehand so that gamma correction processing (hereinafter, referred to as "gamma correction in image forming") different from the above-described processing is performed as the image processing in the image forming processing in step S411 in the "scan-and-transmit" function. For example, even if a scan target document is originally a white sheet, the scan image may have a slight background color depending on the quality of the sheet or the state of a light source or sensor of the scanner, so that the gamma correction processing in image forming is performed to remove the background color. Thus, in the case in which the gamma correction in image forming is performed in step S411, luminance correction may be performed after the effect of the gamma correction in image forming is eliminated, and then the gamma correction in image forming may be performed again.

Figure 19:
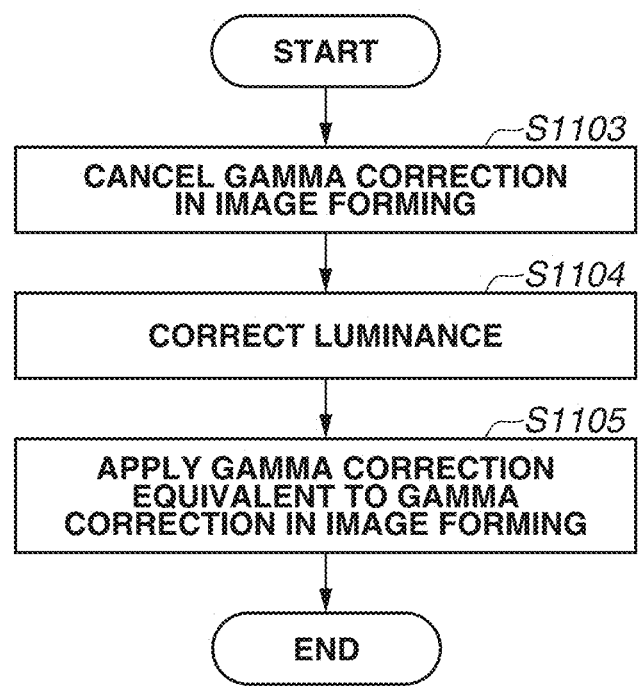
FIG. 19 is a flowchart illustrating a second method of the luminance adjustment process.

FIG. 19 is a flowchart illustrating a process of image luminance adjustment processing. A program for realizing the process illustrated in FIG. 19 is stored in the ROM 117 or the HDD 119, and the CPU 111 reads and executes the program to thereby realize the process.

In step S1103, the CPU 111 performs conversion so as to cancel the effect of the gamma correction in image forming (i.e., so as to perform multiplication by an inverse function). For example, gamma correction is executed on the luminance input in image forming using a value of the power of 1.8 (or the power of about 1.0 to about 3.0).

$$R' = 255 \times \left(\frac{R}{255}\right)^{(1.8)} \quad \text{Formulas 6}$$

-continued $$G' = 255 \times \left(\frac{G}{255}\right)^{(1.8)}$$

$$B' = 255 \times \left(\frac{B}{255}\right)^{(1.8)}$$

The above-described conversion formula makes it possible to perform conversion so as to cancel the effect of gamma correction in image forming (i.e., so as to perform multiplication by an inverse function).

Then, in step S1104, the CPU 111 performs conversion to adjust the luminance of the image. For example, the luminance is adjusted by multiplying an input signal value by a predetermined coefficient.

R'=R×rate, where rate>1.0

G'=255×rate, where rate>1.0

B'=255×rate, where rate>1.0      Formulas 7:

Then, in step S1105, the CPU 111 performs conversion so as to perform gamma correction equivalent to the gamma correction in image forming. For example, gamma correction using a value to the power of 1/1.8 (or the power of about 1/1.0 to about 1/3.0) is executed on the luminance input in image forming.

$$R' = 255 \times \left(\frac{R}{255}\right)^{\left(\frac{1.0}{1.8}\right)} \quad \text{Formulas 8}$$

$$G' = 255 \times \left(\frac{G}{255}\right)^{\left(\frac{1.0}{1.8}\right)}$$

$$B' = 255 \times \left(\frac{B}{255}\right)^{\left(\frac{1.0}{1.8}\right)}$$

Conversion to perform gamma correction equivalent to the gamma correction in image forming can be performed using the above conversion formula.

Figure 20:
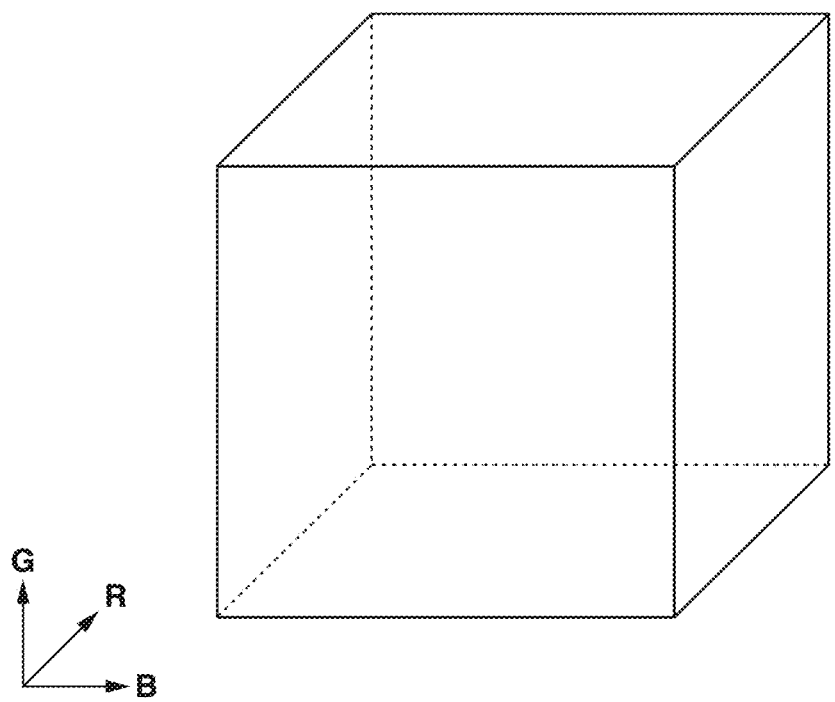
FIG. 20 is a conceptual diagram illustrating a configuration of a three-dimensional lookup table (LUT).

Conversion processing using a three-dimensional LUT will be described as the third method. The three-dimensional LUT is used to convert input RGB data into different RGB data. FIG. 20 illustrates a conceptual configuration of the three-dimensional LUT, and orthogonal axes of 0 to 255 are respectively set in three directions of R, G, and B. The orthogonal axes correspond to each pixel of input RGB data. Entry points of the LUT are discretely distributed on the orthogonal axes, and an RGB output value of the three-dimensional LUT is stored for each entry point. Hereinafter, the entry point will be referred to as "grid point". FIG. 13 illustrates an example of a grid point table in a case in which a grid point interval is 17. Input R, input G, and input B in FIG. 13 are coordinates on the orthogonal axes in FIG. 20. Output R, output G, and output B are output values corresponding to a combination of the input R, the input G, and the input B. For example, in a case in which the input R, the input G, and the input B are (0, 0, 17), the output R, the output G, and the output B are (0, 0, 19).

A value other than an RGB value corresponding to a grid point is also input to the three-dimensional LUT. In this case, an output RGB value is determined by interpolation processing. Specifically, if an input RGB value is input to the three-dimensional LUT, four grid points including the coordinates, i.e., grids to be the vertexes of a triangular pyramid, are determined. Then, output RGB values are determined by linear interpolation based on the output RGB values of the grids and the distance between each grid and the coordinates of the input RGB value. More details are as discussed in Japanese Patent Application Laid-Open No. 2005-354421.

Figure 21:
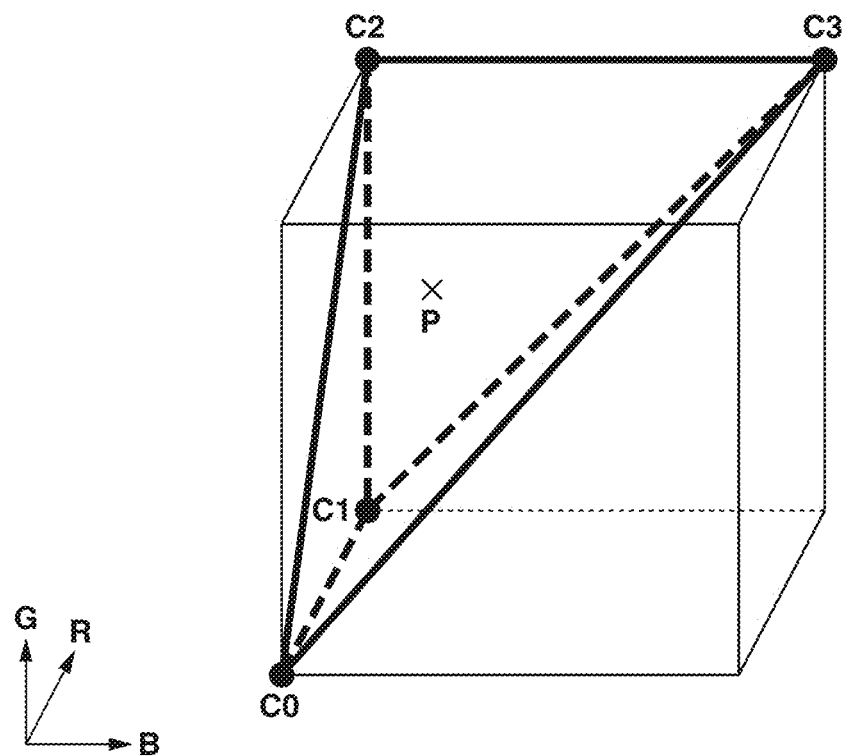
FIG. 21 illustrates a relationship between the three-dimensional LUT and an input pixel signal P.

For example, in a case in which four grids including an input pixel signal P are as illustrated in FIG. 21, the four grids are C0, C1, C2, and C3.

The output RGB values stored in the grids are
C0: (R_C0, G_C0, B_C0),
C1: (R_C1, G_C1, B_C1),
C2: (R_C2, G_C2, B_C2), and
C3: (R_C3, G_C3, B_C3),
and the distance between the grids is N.

Further, at the time when the four grids are selected, weighting factors of A0, A1, A2, and A3 are calculated based on the distance between each grid and the coordinates of the input RGB value.

Then, the output RGB values R2, G2, and B2 of the three-dimensional LUT with respect to the input RGB signal are derived by linear interpolation as follows, $$R2=(A0 \times R\_C0+A1 \times R\_C1+A2 \times R\_C2+A3 \times R\_C3)/N,$$

$$G2=(A0 \times G\_C0+A1 \times G\_C1+A2 \times G\_C2+A3 \times G\_C3)/N,$$
and $$B2=(A0 \times B\_C0+A1 \times B\_C1+A2 \times B\_C2+A3 \times B\_C3)/N.$$

As described above, use of the three-dimensional LUT makes it possible to non-linearly convert the input RGB signal and output an RGB signal having different color space characteristics. Increasing the number of grid points increases the accuracy of the interpolation calculation, but there is an increase in the amount of memory to be used.

In step S602, the luminance-gain-adjusted RGB signal is converted into a standardized RGB signal, such as sRGB, because the luminance-gain-adjusted RGB signal merely has characteristics which are dependent on the optical device. In the conversion, a one-dimensional LUT for gamma correction and the three-dimensional LUT are often used in combination because the conversion is usually non-linear conversion and not executable by simple linear calculation processing.

The parameter of the three-dimensional LUT used in the conversion is expected to be optimized and designed for normal scanning in which the multi-cropping is set to off. In this case, since non-linear conversion is performed in step S602, even if linear processing is performed in the luminance adjustment processing in step S604, it is not possible to return the RGB value to an RGB value equivalent to the RGB value at the time of the normal scan. In this case, luminance adjustment processing is also performed by performing RGB signal conversion using the three-dimensional LUT in this step.

Figure 22A:
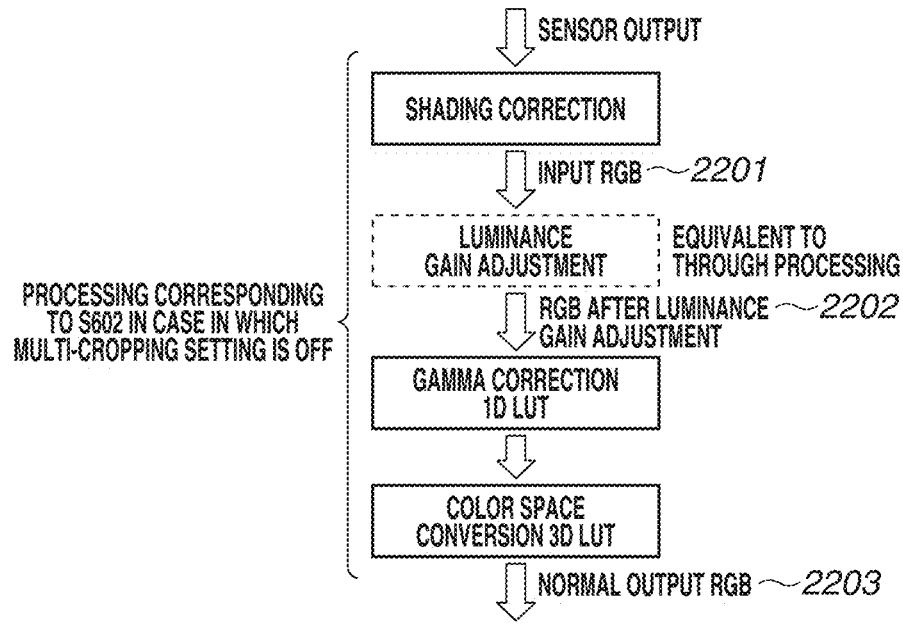
FIGS. 22A to 22D illustrate a process using three-dimensional LUTs.

Next, a method of generating a luminance adjustment three-dimensional LUT for luminance adjustment will be described with reference to FIGS. 22A to 22D. FIG. 22A illustrates a flow of the RGB signal in the case in which the multi-cropping setting is off. An input RGB 2201 is a signal obtained by performing shading correction and normalizing the luminance of the image based on a predetermined white color reference. The luminance gain adjustment is performed on the signal, but in the case in which the multi-cropping setting is off, the luminance gain adjustment processing is substantially equivalent to through-processing. Thus, an RGB 2202 after the luminance gain adjustment is equivalent to the input RGB 2201. Even in this case, the processing of replacing the signal value in a range where the signal value is 255 or more with 255 is performed. There-after, the signal converted into a standardized RGB by processing using a gamma correction one-dimensional LUT and processing using a color space conversion three-dimensional LUT is a normal output RGB 2203. No subsequent processing is performed because the multi-cropping setting is off.

Figure 22B:
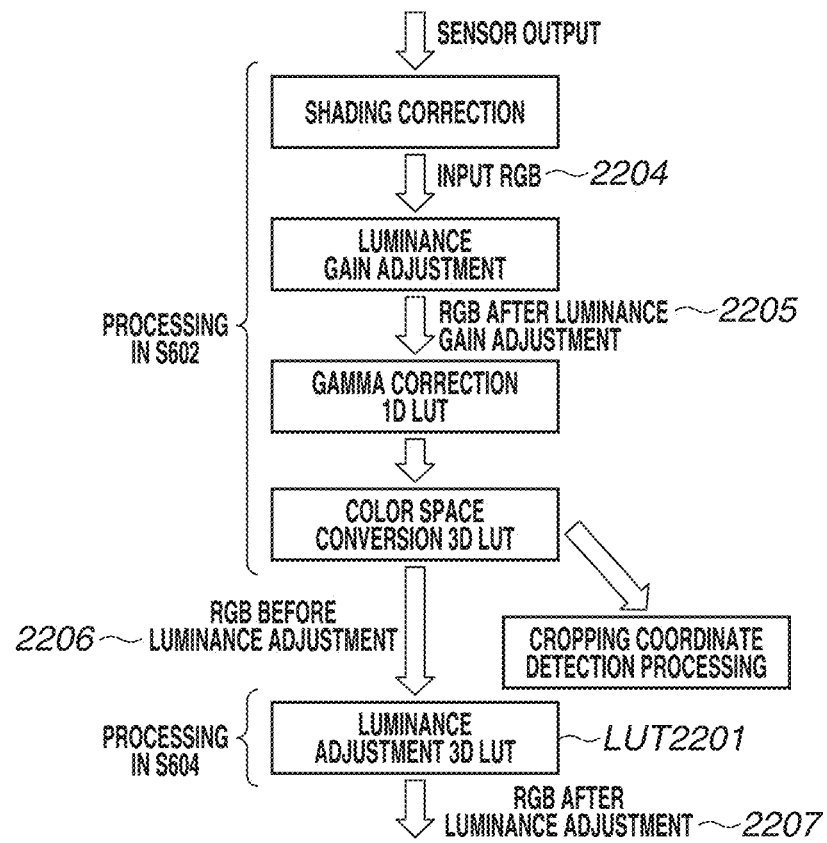

FIG. 22B illustrates a flow of the RGB signal in the case in which the multi-cropping setting is on. An input RGB 2204 is a signal obtained by performing shading correction and normalizing the luminance of the image based on the predetermined white color reference. This signal is equivalent to the input RGB 2201. Luminance gain adjustment is performed on the signal to obtain an RGB 2205 after the luminance gain adjustment. Thereafter, processing using the gamma correction one-dimensional LUT and processing using the color space conversion three-dimensional LUT is performed on the signal to generate an RGB 2206 on which the luminance adjustment has not been performed yet. The gamma correction one-dimensional LUT and the color space conversion three-dimensional LUT used at the time of generating the RGB 2206 on which the luminance adjustment has not been performed are LUTs having the same parameter as that in FIG. 22A. However, since the luminance gain adjustment is performed, the normal output RGB 2203 and the RGB 2206 on which the luminance adjustment has not been performed are not the same output. This signal is an input signal of a luminance adjustment three-dimensional LUT 2201 and cropping coordinate detection processing. The purpose of the luminance adjustment processing in step S604 is to convert the RGB 2206 on which the luminance adjustment has been performed into a signal equivalent to the normal output RGB 2203. In other words, the role of the luminance adjustment three-dimensional LUT 2201 is to convert the RGB 2206 on which the luminance adjustment has not been performed to adjust an output signal 2207 after the luminance adjustment to a signal equivalent to the normal output RGB 2203. The signals do not become the same due to the accuracy of interpolation calculation and the bit accuracy, so that the purpose is to output a signal substantially equivalent to the normal output RGB 2203.

How to obtain the parameter of the luminance adjustment three-dimensional LUT 2201 for the goal will be described. First, combinations of the RGB values of the normal output RGB 2203 and the RGB 2207 after the luminance adjustment in a case in which the RGB values of the input RGB 2201 and the input RGB 2204 are the same are acquired. Various combinations are acquired by changing the RGB values of the input RGB 2201 and the input RGB 2204 to generate a combination table. The RGB values are changed from zero to X for each of R, G, and B. X is the smallest value among the signal values of the input RGB 2204 from which the RGB 2205 after the luminance gain adjustment with a signal value of 255 is acquired in FIG. 22B. In the present exemplary embodiment, X is 265, as specified in FIG. 6B. The combination table contains combinations of the input and output of the luminance adjustment three-dimensional LUT 2201. The input is the RGB value of the RGB 2206 on which the luminance adjustment has not been performed, and the output is the RGB value of the normal output RGB 2203. The parameter of the luminance adjustment three-dimensional LUT 2201 is acquired by acquiring the RGB values stored in the grid points of the three-dimensional LUT based on the combination table. The coordinates of a grid point are the RGB values of the RGB 2206 on which the luminance adjustment has not been performed, and the value stored in the grid point is the normal output RGB 2203 which corresponds to the RGB values of the RGB 2207 after the luminance adjustment. For grid points in which the values of the normal output RGB 2203 are not acquired as the RGB values of the RGB 2207 after the luminance adjustment, the values are acquired by interpolating the RGB values of the normal output RGB 2203 that are stored in other grid points near the coordinates of the grid point. In this way, the luminance adjustment three-dimensional LUT which enables non-linear luminance adjustment processing is generated.

Figure 22C:
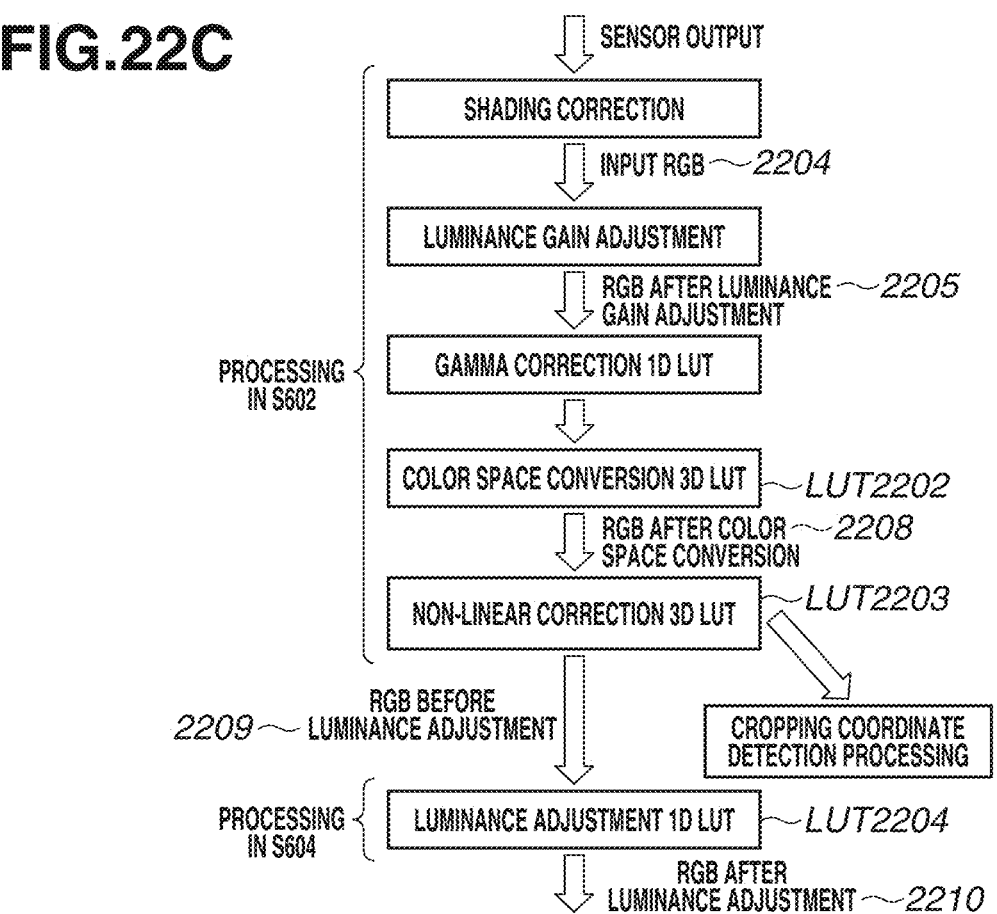

In the above-described methods, the processing using the three-dimensional LUT is to be performed twice. The calculation cost of the processing using the three-dimensional LUT is high. Further, in a case in which the processing using the luminance adjustment three-dimensional LUT is to be performed by an external server, the luminance adjustment three-dimensional LUT for each device type is to be held in the external server. A method in which the three-dimensional LUT is used only once in order to solve the above-described issue will be described with reference to FIGS. 22C and 22D. In FIG. 22C, the luminance adjustment three-dimensional LUT 2201 in FIG. 22B is divided into a non-linear correction three-dimensional LUT 2203 and a luminance adjustment one-dimensional LUT 2204 that are provided before and after the cropping coordinate detection processing. The luminance adjustment one-dimensional LUT 2204 only performs processing to return the luminance gain to the original value. Specifically, calculation processing is performed for each of the R, G, and B signals using formula 6 below.

$$\mathrm{OUT} = \mathrm{IN} \times \frac{\mathrm{luminance\ gain\ adjustment\ parameter}}{255}$$

In formula 6, IN is the input of the luminance adjustment one-dimensional LUT 2204, and OUT is the output of the luminance adjustment one-dimensional LUT 2204. In a case in which the value of OUT exceeds 255, the processing to adjust the value to 255 is performed. The luminance gain adjustment parameter of the same values as those in formula 1 are used. While the parameter is 265 in the present exemplary embodiment, the parameter can be any other value that is the same parameter as that in formula 1. Formula 6 is used to perform the processing for undoing the luminance gain adjustment processing performed on the signal value in formula 1 back to the original. However, the processing using the gamma correction one-dimensional LUT and the processing using the color space conversion three-dimensional LUT are not taken into consideration. Thus, the processing is accommodated by the non-linear correction three-dimensional LUT 2203. Specifically, the role of the non-linear correction three-dimensional LUT 2203 is to process an RGB 2008 after the color space conversion and output an output signal 2209 on which the luminance adjustment has not been performed, and the role of the luminance adjustment one-dimensional LUT 2204 is to further process and adjust the output signal 2209 to a signal equivalent to the normal output RGB 2203. The signals do not become the same due to the accuracy of the interpolation calculation and the bit accuracy, so that the purpose is to output a signal equivalent to the normal output RGB 2203.

Figure 22D:
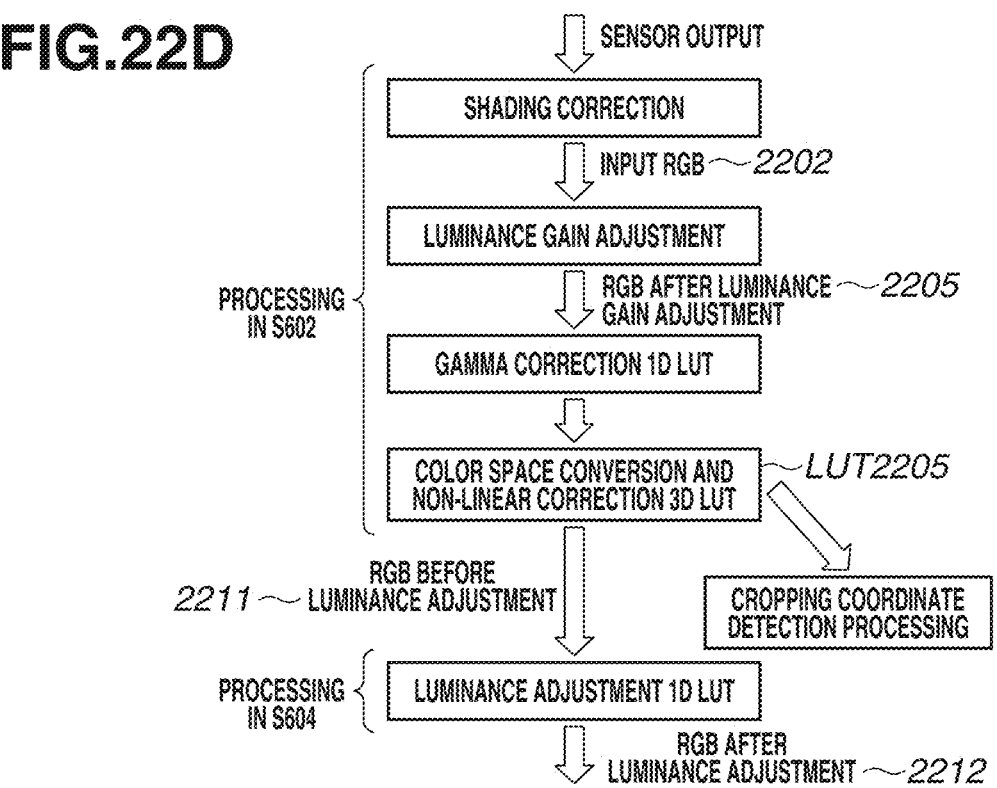

How to obtain the parameter of the non-linear correction three-dimensional LUT 2203 will be described. First, the same combination table as that used to obtain the parameter of the luminance adjustment three-dimensional LUT 2201 is obtained. While the input value in the case of obtaining the parameter of the luminance adjustment three-dimensional LUT 2201 is the RGB 2206 on which the luminance adjustment has not been performed, the input value in the case of obtaining the non-linear correction three-dimensional LUT 2203 is an RGB 2208 on which the color space conversion has been performed. The values of the RGB 2206 and the RGB 2208 are the same. Next, the output value (RGB value of the normal output RGB 2203) of the combination table is converted using formula 1 because the value to be obtained is an RGB 2209 on which the luminance adjustment has not been performed and which is the output of the non-linear correction three-dimensional LUT 2203. If the converted value is processed using the luminance adjustment one-dimensional LUT 2204, a luminance-adjusted RGB 2210 and the normal output RGB 2203 become equivalent values. However, the RGB 2209 on which the luminance adjustment has not been performed only has a value of zero to (255×255/luminance gain adjustment parameter). In the case in which the luminance gain adjustment parameter is 265, the RGB 2209 is about 245. For the cropping coordinate detection processing, a value near 255 is important, so that a value near 255 is preserved as the output value of the non-linear correction three-dimensional LUT 2203. Thus, in the case in which the converted output value is a value of (255×255/luminance gain adjustment parameter), correction is performed so as to output the signal value of the input value directly as an output value. On the other hand, in the case in which the corrected output value is less than the value of (255×255/luminance gain adjustment parameter), the corrected output value remains the value of (255×255/luminance gain adjustment parameter). Even if the above-described correction processing is performed, since 255 is output in the processing using the luminance adjustment one-dimensional LUT 2204. Thus, no issue arises. FIG. 23 illustrates a specific example. FIG. 23 illustrates two examples of combinations from the combination table in the case in which the luminance gain adjustment parameter is 265. In the case of a combination Index 1, an output value RGB (80, 53, 124) is converted, an output value RGB (77.0, 51.0, 119.3) converted using formula 1 is obtained. The correction processing is not performed because no RGB value satisfies the correction condition (255×255/265 245.4), so that the output value on which the correction processing has been performed is the same as the output after the conversion. If the output value RGB on which the correction processing has been performed is processed using the luminance adjustment one-dimensional LUT 2204, an RGB (80, 53, 124) on which the luminance adjustment has been performed is obtained, and the obtained RGB is the same as the output value RGB, so that it is understood that the conversion processing is correct. In the case of a combination Index 2, an output value RGB (228, 255, 255) is converted, and an output value RGB (219.4, 245.4, 245.4) converted using formula 1 is obtained. The correction processing is performed on G and B, which are the RGB values that satisfy the correction condition (255×255/265=245.4). As to G, the input value is 243, which is less than 245.4, so that the value remains 245.4. As to B, the input value is 250, which exceeds 245.4, so that the value is 250. As a result, the output value RGB on which the correction processing has been performed is (219.4, 245.4, 250). If the output value RGB on which the correction processing has been performed is processed using the luminance adjustment one-dimensional LUT 2204, an RGB (228, 255, 255) on which the luminance adjustment has been performed is obtained. The obtained RGB is the same as output value RGB, so that it is understood that the conversion processing is correct. As to B, the processing to adjust a value exceeding 255 to 255 is in execution. The corrected output value RGB which is calculated as described above is referred to as the output of the non-linear correction three-dimensional LUT 2203. Further, the RGB 2208 on which the color space conversion has been performed is referred to as the input of the non-linear correction three-dimensional LUT 2203. If the RGB value stored in the grid point of the three-dimensional LUT is obtained from the input/output combination table, the parameter of the non-linear correction three-dimensional LUT 2203 is obtained. The coordinates of the grid point are the RGB value of the RGB 2208 on which the color space conversion has been performed, and the values stored in the grid point are the RGB values of the corrected output value with which the RGB values of the color-space-converted RGB 2208 are to be associated as a combination. In a case in which the combination table does not contain the RGB values of the color-space-converted RGB 2208 which are the coordinates of the grid point, the RGB values of the corrected output values which are combinations of coordinates near the coordinates of the grid point are interpolated to determine a value to be stored in the grid point. In this way, the non-linear correction three-dimensional LUT 2203 which enables non-linear luminance adjustment processing and can be combined with the luminance adjustment one-dimensional LUT is generated. The non-linear correction three-dimensional LUT 2203 generated as described above can be combined with the color space conversion three-dimensional LUT 2202. This is illustrated in FIG. 22D. In FIG. 22D, a color space conversion and non-linear correction three-dimensional LUT 2205 is a combination of the color space conversion three-dimensional LUT 2202 and the non-linear correction three-dimensional LUT 2203. The LUTs 2202 and 2203 are combined so that the number of times the three-dimensional LUT processing is performed is reduced to once.

As described above, even if non-linear processing is performed in the processing in the case in which the multi-cropping processing is off, a final signal value in the case in which the multi-cropping processing is on is adjusted to a signal equivalent to a signal in the case in which the multi-cropping processing is off, using the three-dimensional LUTs.

While the three methods for the image luminance adjustment processing are described in the present exemplary embodiment, the methods are not intended to limit an image luminance adjustment method, and any method other than the above-described methods can be used as long as it is capable of increasing the brightness of the entire image.

<Method of Image Cropping Output Processing>

Figure 14:
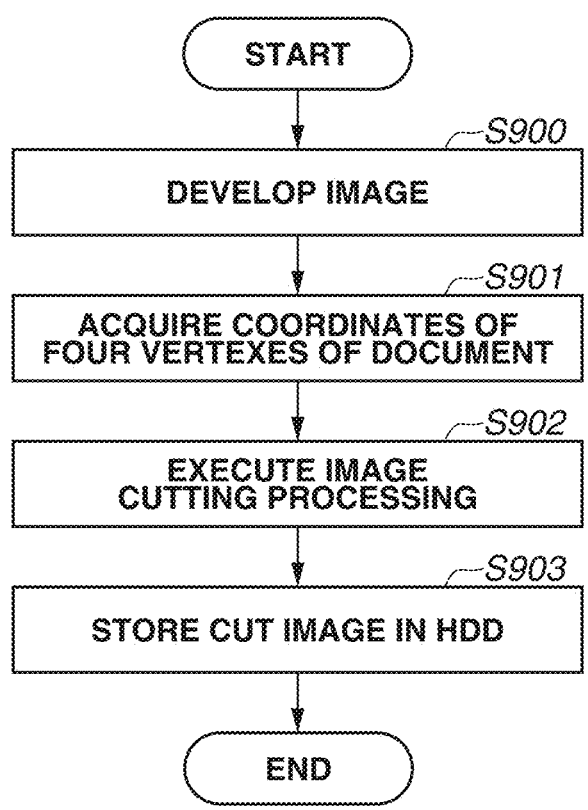
FIG. 14 is a flowchart illustrating an image cropping process according to the first exemplary embodiment of the disclosure.

Next, FIG. 14 is a flowchart illustrating a process in which the CPU 111 crops, outputs, and stores an image corresponding to a document. A program for executing the process illustrated in FIG. 14 is stored in the ROM 117 or the HDD 119, and the CPU 111 executes the program to thereby realize the process.

In step S900, the CPU 111 develops, onto the RAM 118, an image stored in the HDD 119 in step S604 in FIG. 7. Specifically, in step S900, the CPU 111 develops the JPEG-compressed image stored in the HDD 119.

In step S901, the CPU 111 acquires the coordinates that are detected in step S603 in FIG. 7 and stored in the HDD 119.

In step S902, the CPU 111 executes image cropping processing using the image acquired in step S900 and the coordinates of the four vertexes of each document that are acquired in step S901. A publicly-known method is used to crop the image. For example, in a case in which a rectangle formed by connecting the four points acquired in step S901 is not inclined, the CPU 111 crops a region surrounded by the four vertexes. Further, in a case in which the rectangle formed by connecting the four vertexes is inclined, the CPU 111 determines a region to be cropped using a publicly-known affine transformation which takes only the rotation into consideration. Further, the CPU 111 can determine a region to be cropped using projection conversion using a homography matrix which takes trapezoidal correction and distortion correction into consideration in addition to the rotation.

In step S903, the CPU 111 compresses the image cropped in step S902 and stores the compressed image in the HDD 119. FIG. 15 illustrates the image stored in the HDD 119 in step S903. In step S903, the images of the documents in FIGS. 15A, 15B, and 15C from the input image in FIG. 5D are stored in the HDD 119.

While the process of the "scan-and-transmit" function is described as an example in the present exemplary embodiment, the present exemplary embodiment is executable regardless of whether the function is the "scan-and-transmit" function. For example, the present exemplary embodiment is executable in a "scan and store" function, in which a scan image is stored in the image processing apparatus 100, or a fax transmission function, in which a multi-cropped document image is fax-transmitted.

Further, in the present exemplary embodiment, the image processing apparatus 100 executes cropping coordinate detection, image luminance correction, and image cropping processing. The image processing apparatus 100 can perform a scan and transmits a luminance-gain-adjusted image to a server, personal computer (PC), or cloud. Then, the cropping coordinate detection, the image luminance correction, and the image cropping processing can be executed on the server, PC, or cloud.

As described above, in the case of performing multi-cropping processing, a scan image is generated in such a manner that a signal on a high-luminance side is preserved at the time of scanning a document so as to facilitate detection of a region corresponding to the document from the scan image, and the luminance of the scan image is adjusted to generate an image with suitable brightness for storage.

A second exemplary embodiment will be described below. In the first exemplary embodiment, an edge portion of a document is extracted using an image processed so as to be entirely darker than a normal image while changing the parameter for use in luminance gain adjustment. Then, the luminance of the image used to extract the edge portion of the document is corrected to increase the brightness of the entire image, thereby generating an image for storage. There are some cases in which, if digital processing is performed using the method described above in the first exemplary embodiment to correct the luminance of the image to increase brightness, the color tint and gradation can be changed in an image acquired with normal brightness. In the second exemplary embodiment, a method will be described in which whether to perform document brightness adjustment using digital processing or to re-scan the document and perform luminance gain adjustment using a parameter used in a normal scan is selected based on a multi-cropping processing setting.

In a case of scanning a document, such as a picture, which prioritizes image quality such as image color tint and gradation, re-scanning is executed after luminance gain adjustment is performed using a parameter for multi-cropping, and then luminance gain adjustment is performed using a parameter for use in a normal scan. In this way, the accuracy of cropping coordinates can be increased while the image quality and color tint of the document are preserved. On the other hand, in a case of scanning a document for which image quality does not have to be prioritized, such as a monochrome document or text-only document, the processing time that is needed to acquire an image for each document can be reduced by increasing the image luminance using digital processing.

In a case of scanning a document and transmitting the scan document to an external apparatus and storing the scan document in the image processing apparatus 100, various types of image processing are performed. For example, in a case in which an instruction to perform binarization processing and then store data or an instruction to perform text recognition and then store data as text string data is issued, a decrease in color tint or gradation of an image to be stored does not cause any issue. Thus, in the case in which a binarization processing instruction or text recognition processing instruction is issued, the image processing apparatus 100 extracts an image corresponding to a document from an image acquired by correcting the luminance of the image having undergone luminance gain adjustment using the parameter for multi-cropping. In a case in which a setting to perform JPEG conversion or processing dedicated to an entire picture is set, color tint and gradation are secured. Thus, luminance gain adjustment is performed on an image acquired by a first scan using the parameter for multi-cropping, and an edge of each document is detected. Then, luminance gain adjustment is performed on an image acquired by a second scan using the parameter for the normal scan, and an image for storage is generated. In this way, the color tint and gradation of the image for storage are preserved.

In the present exemplary embodiment, the processing is switched according to whether the processing is subsequent processing that prioritizes image quality or subsequent processing that prioritizes processing speed (subsequent processing that does not prioritize image quality). FIG. 16 is a flowchart illustrating a process that is executed by the image processing apparatus 100 according to the second exemplary embodiment. A program for executing the process illustrated in FIG. 16 is stored in the ROM 117 or the HDD 119. The CPU 111 reads and executes the process stored in the ROM 117 or the HDD 119 to thereby realize the process. Processing that is similar to processing in FIG. 7 is given the same reference numeral as that in FIG. 7. Only the processing that is different from FIG. 7 will be described.

In step S1601, the CPU 111 determines whether the set setting value is a setting value to prioritize image quality. While there are various methods for determining whether a setting to prioritize image quality is set, the CPU 111 determines whether a setting to prioritize image quality is set using the table illustrated in FIG. 17 in the present exemplary embodiment. The CPU 111 refers to the user-set setting value and determines whether a setting value to prioritize image quality is set. If a setting value to prioritize image quality is not set (NO in step S1601), the CPU 111 executes the processing in step S604 and subsequent steps. In the case in which a setting to prioritize image quality is not set, the luminance of the image acquired by performing luminance gain adjustment using the luminance gain adjustment parameter for multi-cropping is increased using digital processing, as in the first exemplary embodiment. In this way, the time needed to complete multi-cropping processing is reduced.

On the other hand, if a setting value to prioritize image quality is set (YES in step S1601), the CPU 111 executes the processing in step S1602 and subsequent steps.

In step S1602, the CPU 111 reads, from the ROM 117, the luminance gain adjustment parameter for use in the case in which the multi-cropping processing is set to off, and stores the read luminance gain adjustment parameter in the RAM 118. The luminance gain adjustment parameter for use in the case in which the multi-cropping processing is set to off has a smaller value than that of the luminance gain adjustment parameter set in step S600. The luminance gain adjustment parameter for use in the case in which the multi-cropping processing is off is stored in advance in the ROM 117.

In step S1603, the CPU 111 controls the scanner unit 120 via the scanner OF unit 114 to scan the document. The processing executed by the CPU 111 in step S1603 is similar to the processing executed by the CPU 111 in step S601.

In step S1604, the CPU 111 adjusts the luminance of the image acquired in step S1603 using the luminance gain adjustment parameter acquired in step S1602. The processing executed in step S1604 is similar to the processing described above with reference to FIG. 8, so that description thereof is omitted. The processing in step S1604 is executed to thereby generate the image illustrated in FIG. 5B. The subsequent processing is similar to the processing in step S605 and subsequent steps, so that description thereof is omitted. In the case in which the setting to prioritize image quality is set as in steps S1602 to S1604 described above, luminance gain adjustment is performed using the same parameter as that in the normal scan. In this way, an image of a document is cropped from an image that secures image quality and color tint similar to those in the case in which the multi-cropping processing is not performed.

As described above, a method of generating an image from which an image is to be cropped is switched according to the setting value. In this way, the processing is switched between the case in which image quality, such as color tint and gradation, is prioritized and the case in which performance and speed, such as user hand separation speed, is prioritized.

In the present exemplary embodiment, the processing is switched based on a setting value that is set according to a user instruction. Alternatively, whether to perform processing that prioritizes image quality can be determined by analyzing the image acquired by the scan in step S601. For example, the CPU 111 can switch whether to execute the processing in step S1601 and subsequent steps or the processing in step S604 and subsequent steps based on the number of colors contained in the scan image or based on the presence/absence of gradation. At this time, the CPU 111 executes step S1601 and subsequent steps if the number of colors contained in the image is a predetermined number or more or if the image contains a gradation region.

Further, in the present exemplary embodiment, in the case in which the setting to prioritize image quality is set, the document is scanned again, and luminance gain adjustment is executed using a luminance gain adjustment parameter that is different from the luminance gain adjustment parameter used in step S602. In a case in which the image processing apparatus 100 includes a memory to store the image acquired by scanning the document in step S601, luminance gain adjustment can be executed on the image stored in the memory in step S1604. In this case, the document does not need to be re-scanned in step S1603. Thus, even in the case of prioritizing image quality, multi-cropping processing is executable without scanning the document twice.

A third exemplary embodiment will be described. In the first exemplary embodiment, the parameter for use in luminance gain adjustment is changed, and an edge portion of a document is extracted using an image processed so as to be entirely darker than a normal image. Then, the luminance of the image used to extract the edge portion of the document is corrected and the brightness of the entire image is increased to thereby generate an image for storage. In the methods described in the first exemplary embodiment, the luminance of the entire image of the document is corrected and then a portion is cropped from part of the image. Since the luminance of the entire image is adjusted, the luminance of a portion that does not have to be adjusted in a final image may also be adjusted, which decreases processing performance. In the third exemplary embodiment, a method will be described in which an image of each detected document is cropped and then luminance adjustment is performed only on the cropped image in order to increase processing performance.

Figure 18:
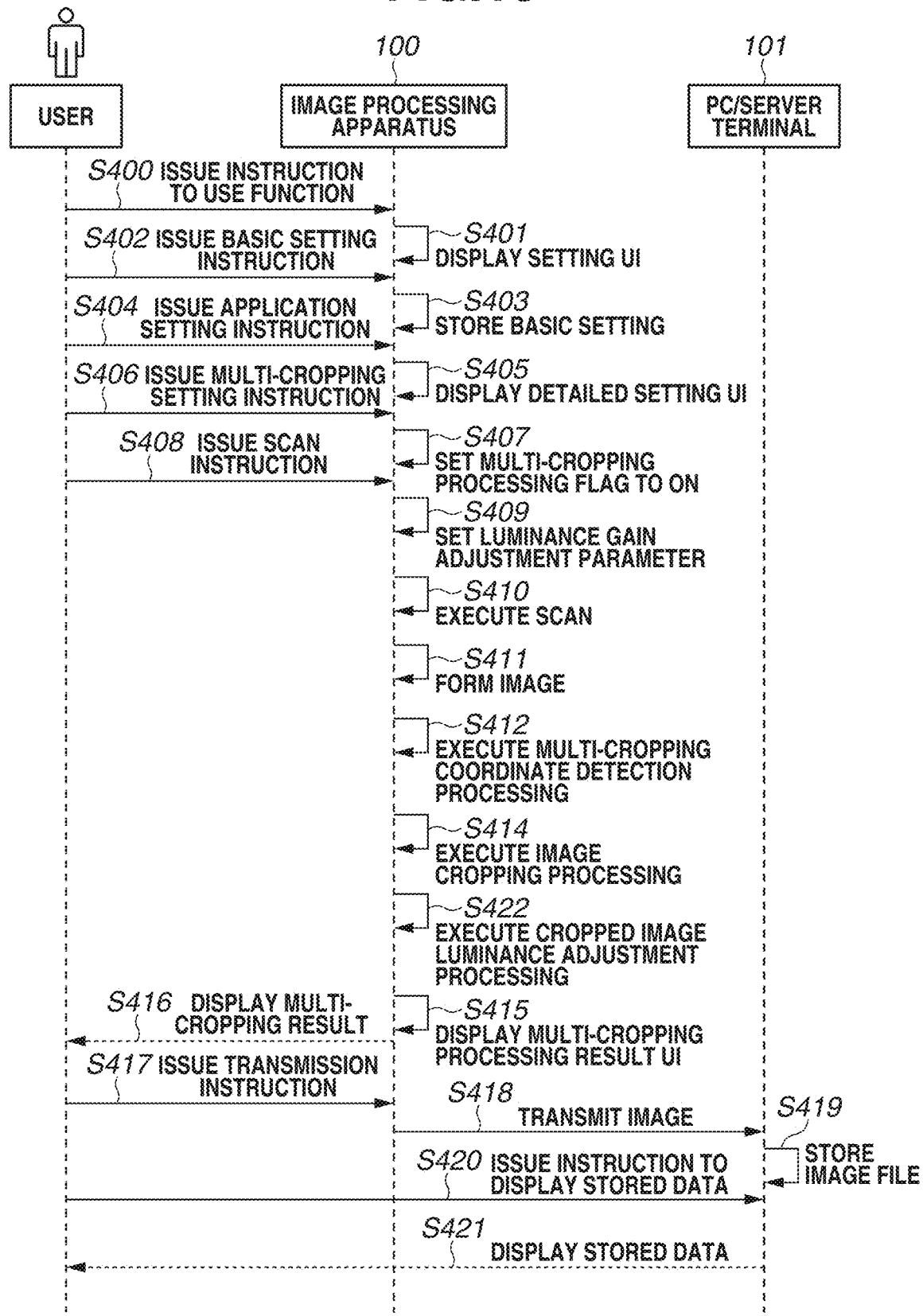
FIG. 18 illustrates a sequence of an entire image processing function according to a third exemplary embodiment of the disclosure.

FIG. 18 illustrates a sequence in which multi-cropping processing is executed when the user uses the "scan-and-transmit" function. FIG. 18 is different from FIG. 3 in that details of the image cropping processing in step S414 are changed and cropped image luminance adjustment processing (step S422) is added between the image cropping processing (step S414) and the multi-cropping processing result UI display processing (step S415).

The processing in steps S400 to S412 and step S415 and subsequent steps are similar to those in the first exemplary embodiment, so that detailed description thereof is omitted.

In the image cropping processing in step S414, the image processing apparatus 100 crops each document image corresponding to a document from the image stored as data in the HDD 119 in step S411. The image processing apparatus 100 crops a rectangular document image also using an affine transformation, such as inclination correction, based on the coordinates of the four vertexes of the upper left, upper right, lower right, and lower left of the document. The image processing apparatus 100 compresses the cropped image and stores the compressed image in the HDD 119.

In the cropped image luminance adjustment processing in step S422, the image processing apparatus 100 adjusts the luminance of each document image cropped and stored in the HDD 119 in step S414. The luminance adjustment processing in step S422 is similar to the image luminance adjustment processing in step S413 described above in the first exemplary embodiment. Specifically, in the cropped image luminance adjustment processing in step S422, the processing to increase the luminance of each document image is performed to thereby generate an image with brightness equivalent to the brightness of an image scanned using the normal setting.

As described above, a coordinate position is detected from an image suitable for the document position detection, and each image of a document is cropped from the image, and the luminance of the cropped document image is adjusted to thereby generate an image for transmission, whereby the performance of processing increases.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-103878, filed May 30, 2018, and No. 2019-016307, filed Jan. 31, 2019, which are hereby incorporated by reference herein in their entirety.

What is claimed is:

1. An apparatus comprising: at least one processor; and a memory coupled to the at least one processor, the memory having instructions that, when executed by the processor, performs operations as:

a first adjustment unit configured to generate a first image by performing a gain adjustment on signal values acquired by a scanner so that information of the signal values on a high-luminance side is preserved, wherein the first adjustment unit generates the first image by performing the gain adjustment so as to adjust a predetermined luminance value on the high-luminance side at the time of reading the document with the scanner to a first luminance value and thereafter performing processing to replace a luminance value of a pixel having the first luminance value if the luminance value of the pixel on which the gain adjustment has been performed is higher than the first luminance value;

wherein the scanner acquires the signal values by reading a document;

a detection unit configured to detect a position of a region corresponding to the document in the generated first image; a second adjustment unit configured to generate a second image from the first image by making an adjustment so as to increase luminance of at least one pixel contained in the first image; and a cropping unit configured to crop, based on the detected position of the region corresponding to the document, a document image corresponding to the document from the generated second image.

2. The apparatus according to claim 1,
wherein the first image contains an image of a plurality of documents, wherein the detection unit detects a position of each of the regions respectively corresponding to the plurality of documents contained in the first image, and wherein the cropping unit crops each document image corresponding to the plurality of documents from the second document based on positions of the regions respectively corresponding to the plurality of documents.

3. The apparatus according to claim 1, wherein the first adjustment unit performs the gain adjustment linearly on the luminance value of each pixel so as to adjust the predetermined luminance value to the first luminance value.

4. The apparatus according to claim 1, further comprising a display unit configured to display the cropped document image.

5. The apparatus according to claim 1, further comprising:
a text recognition processing unit executes text recognition processing on the cropped document image; and
a storage unit configured to store the cropped document image in association with a result of the text recognition processing executed on the document image.

6. The apparatus according to claim 1, further comprising a transmission unit configured to transmit the cropped document image to a designated destination.

7. The apparatus according to claim 1, wherein the second adjustment unit generates the second image by performing gamma correction processing so as to increase luminance of a pixel contained in the first image.

8. The apparatus according to claim 1, wherein the second adjustment unit generates the second image by performing adjustment using a predetermined three-dimensional lookup table so as to increase luminance of a pixel contained in the first image.

9. The apparatus according to claim 1, further comprising:
a receiving unit configured to receive, from a user, a setting regarding whether to crop the document image; and
a control unit configured to perform,
in a case where the receiving unit receives a setting to crop the document image, control such that the first adjustment unit, the detection unit, the second adjustment unit, and the cropping unit perform processing, and
in a case where the receiving unit receives a setting to not crop the document image, control to output an image adjusted by the first adjustment unit such that a signal value higher than a predetermined signal value on the high-luminance side when the scanner reads the document is a luminance value of white.

10. An apparatus comprising: at least one processor; and a memory coupled to the at least one processor, the memory having instructions that, when executed by the processor, performs operations as:
a first adjustment unit configured to generate a first image by performing a gain adjustment on signal values acquired by a scanner so that information of the signal values on a high-luminance side is preserved, wherein the generating the first image generates the first image by performing gain adjustment so as to adjust a predetermined luminance value on the high-luminance side at the time of reading the document with the scanner to a first luminance value and thereafter performing processing to replace a luminance value of a pixel having the first luminance value if the luminance value of the pixel on which the gain adjustment has been performed is higher than the first luminance value;

wherein the scanner acquires the signal values by reading a document;
a detection unit configured to detect a position of a region corresponding to the document in the generated first image; a cropping unit configured to crop a first document image corresponding to the document from the generated first image, based on the position of the region corresponding to the detected document; and a second adjustment unit configured to generate a second document image by performing adjustment of the cropped first document image so as to increase luminance of at least one pixel contained in the cropped first document image.

11. A non-transitory computer readable storage medium storing a program for causing a processor to perform:
generating a first image by performing a gain adjustment on signal values acquired by a scanner so that information of the signal values on a high-luminance side is preserved, wherein the generating the first image generates the first image by performing gain adjustment so as to adjust a predetermined luminance value on the high-luminance side at the time of reading the document with the scanner to a first luminance value and thereafter performing processing to replace a luminance value of a pixel having the first luminance value if the luminance value of the pixel on which the gain adjustment has been performed is higher than the first luminance value;
wherein the scanner acquires the signal values by reading a document;
detecting a position of a region corresponding to the document in the generated first image; generating a second image from the first image by performing adjustment so as to increase luminance of at least one pixel contained in the first image;
and cropping, based on the detected position of the region corresponding to the document, a document image corresponding to the document from the generated second image.

12. The non-transitory computer readable storage medium according to claim 11,
wherein the first image contains an image of a plurality of documents,
wherein the detecting detects a position of each of the regions respectively corresponding to the plurality of documents contained in the first image, and
wherein the cropping crops each document image corresponding to the plurality of documents from the second document based on positions of the regions respectively corresponding to the plurality of documents.

13. A non-transitory computer readable storage medium storing a program for causing a processor to perform:
generating a first image by performing a gain adjustment on signal values acquired by a scanner so that information of the signal values on a high-luminance side is preserved, wherein the generating the first image generates the first image by performing gain adjustment so as to adjust a predetermined luminance value on the high-luminance side at the time of reading the document with the scanner to a first luminance value and thereafter performing processing to replace a luminance value of a pixel having the first luminance value if the luminance value of the pixel on which the gain adjustment has been performed is higher than the first luminance value;
wherein the scanner acquires the signal values by reading a document;

detecting a position of a region corresponding to the document in the generated first image; cropping a first document image corresponding to the document from the generated first image based on the detected position of the region corresponding to the document; and generating a second document image by performing adjustment of the cropped first document image so as to increase luminance of at least one pixel contained in the cropped first document image.

14. A method that is executed by a processing unit of an apparatus, the method comprising: generating a first image by performing a gain adjustment on signal values acquired by a scanner so that information of the signal values on a high-luminance side is preserved,
  wherein the generating the first image generates the first image by performing gain adjustment so as to adjust a predetermined luminance value on the high-luminance side at the time of reading the document with the scanner to a first luminance value and thereafter performing processing to replace a luminance value of a pixel having the first luminance value if the luminance value of the pixel on which the gain adjustment has been performed is higher than the first luminance value;
  wherein the scanner acquires the signal values by reading a document;
  detecting a position of a region corresponding to the document in the generated first image; generating a second image from the first image by performing adjustment so as to increase luminance of at least one pixel contained in the first image; and cropping, based on the detected position of the region corresponding to the document, a document image corresponding to the document from the generated second image.

15. The method according to claim 14,
  wherein the first image contains an image of a plurality of documents,
  wherein the detecting detects a position of each of the regions respectively corresponding to the plurality of documents contained in the first image, and
  wherein the cropping crops each document image corresponding to the plurality of documents from the second document based on positions of the regions respectively corresponding to the plurality of documents.

16. A method that is executed by a processing unit of an image processing apparatus, the method comprising: generating a first image by performing a gain adjustment on signal values acquired by a scanner so that information of the signal values on a high-luminance side is preserved,
  wherein the generating the first image generates the first image by performing gain adjustment so as to adjust a predetermined luminance value on the high-luminance side at the time of reading the document with the scanner to a first luminance value and thereafter performing processing to replace a luminance value of a pixel having the first luminance value if the luminance value of the pixel on which the gain adjustment has been performed is higher than the first luminance value;
  wherein the scanner acquires the signal values by reading a document; detecting a position of a region corresponding to the document in the generated first image; cropping, based on the detected position of the region corresponding to the document, a first document image corresponding to the document from the generated first image; and generating a second document image by performing adjustment of the cropped first document image so as to increase luminance of at least one pixel contained in the cropped first document image.

* * * * *